(12) United States Patent
Cook

(10) Patent No.: US 10,342,101 B2
(45) Date of Patent: Jul. 2, 2019

(54) LIGHT SOCKET WIFI DEVICE

(71) Applicant: CenturyLink Intellectual Property LLC, Denver, CO (US)

(72) Inventor: Charles I. Cook, Louisville, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 149 days.

(21) Appl. No.: 15/665,058

(22) Filed: Jul. 31, 2017

(65) Prior Publication Data

US 2018/0035518 A1  Feb. 1, 2018

Related U.S. Application Data

(60) Provisional application No. 62/369,574, filed on Aug. 1, 2016.

(51) Int. Cl.
*H05B 37/02* (2006.01)
*H04L 12/28* (2006.01)
*F21V 23/04* (2006.01)

(52) U.S. Cl.
CPC ..... *H05B 37/0272* (2013.01); *H04L 12/2816* (2013.01); *F21V 23/0442* (2013.01); *H04L 2012/285* (2013.01); *H04L 2012/2841* (2013.01)

(58) Field of Classification Search
CPC ............ H05B 37/0272; F21V 23/0442; H04L 12/2816; H04L 2012/2841; H04L 2012/285

USPC ......... 340/12.27, 12.55, 12.32, 12.39, 12.37; 455/90.3

See application file for complete search history.

(56) References Cited

U.S. PATENT DOCUMENTS

| | | | | |
|---|---|---|---|---|
| 6,400,968 | B1* | 6/2002 | White | G08C 17/02 455/127.1 |
| 2003/0199247 | A1* | 10/2003 | Striemer | H04B 7/155 455/11.1 |
| 2004/0192227 | A1* | 9/2004 | Beach | H05B 37/0272 455/90.3 |
| 2005/0184867 | A1* | 8/2005 | Osann, Jr. | G05B 15/02 340/539.25 |
| 2009/0310577 | A1* | 12/2009 | Kiribayashi | H04B 3/54 370/338 |
| 2010/0056078 | A1* | 3/2010 | Feldman | H01Q 1/06 455/90.3 |

(Continued)

*Primary Examiner* — Edwin C Holloway, III

(57) ABSTRACT

Novel tools and techniques are provided for implementing wireless radio functionality in a home or building. In some embodiments, a device may comprise a light socket attachment configured to be inserted into a corresponding light socket, a communications system comprising a non-wired communications device (e.g., a wireless radio, a LiFi device, etc.), a light bulb receptacle configured to receive a light bulb, and/or circuitry configured to receive electric power through the light socket attachment, to direct a specified current to the communications system, and to direct remaining current to the light bulb receptacle. In an additional aspect, the device might be configured to implement a two-terminal or a three-terminal power connection light socket to power the communications system. In some cases, Power-Line Communications ("PLC") may be used to transmit data over the three-terminal power connection to and from the communications system.

21 Claims, 13 Drawing Sheets

(56) References Cited

U.S. PATENT DOCUMENTS

| | | | | |
|---|---|---|---|---|
| 2010/0283391 A1* | 11/2010 | Braunshtein | ....... | H05B 37/0263 315/127 |
| 2012/0139426 A1* | 6/2012 | Ilyes | ....................... | F21V 23/02 315/152 |
| 2015/0305125 A1* | 10/2015 | Chen | ........................ | H02J 7/02 315/155 |
| 2015/0309548 A1* | 10/2015 | Thomas | .................. | G06F 1/266 307/38 |
| 2015/0366039 A1* | 12/2015 | Noori | ................. | H05B 37/0272 315/307 |
| 2016/0198553 A1* | 7/2016 | Fathollahi | .......... | H05B 37/0272 315/291 |
| 2016/0255697 A1* | 9/2016 | Bhide | ...................... | H02J 9/06 315/161 |

* cited by examiner

Communications System

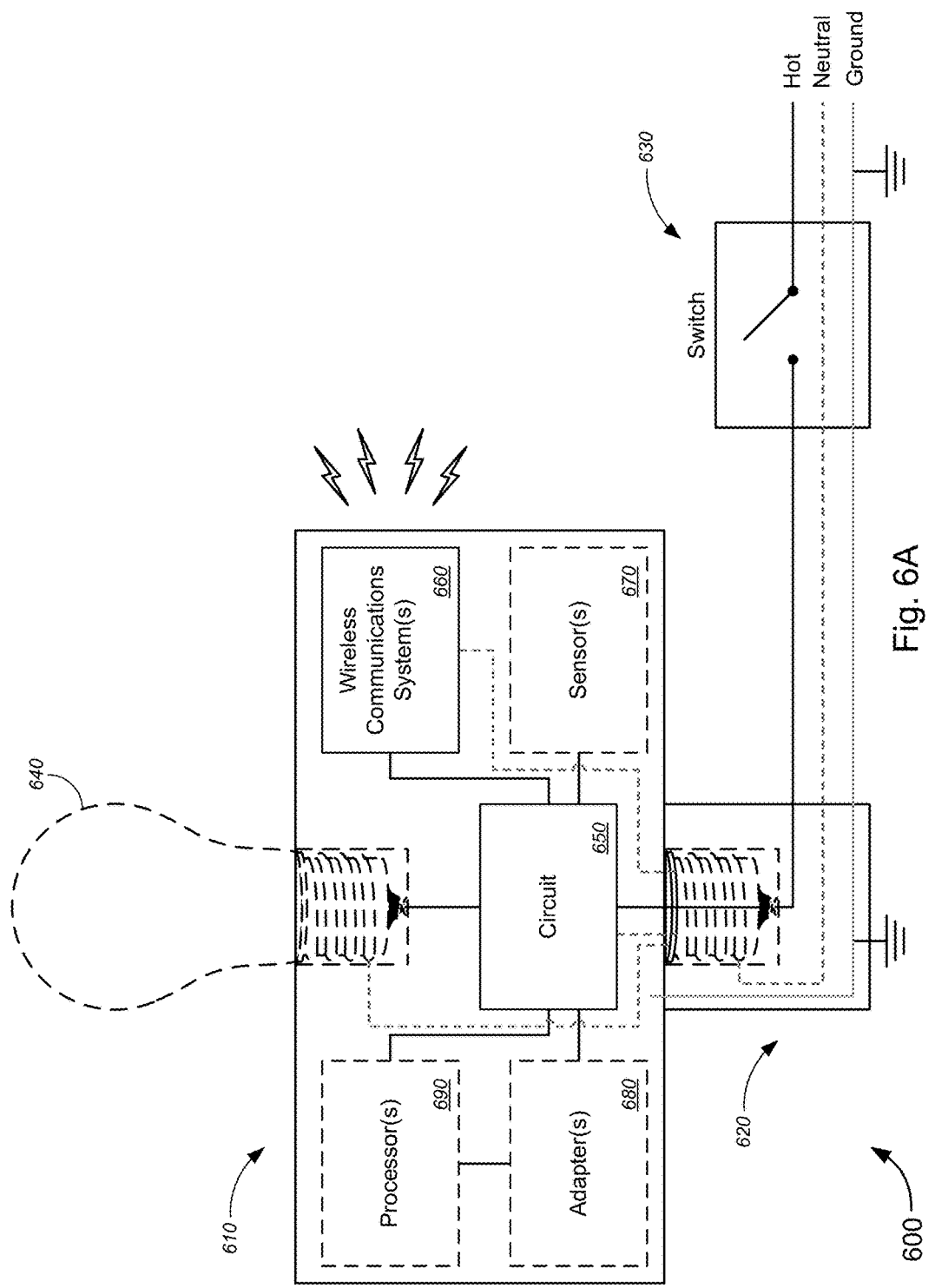

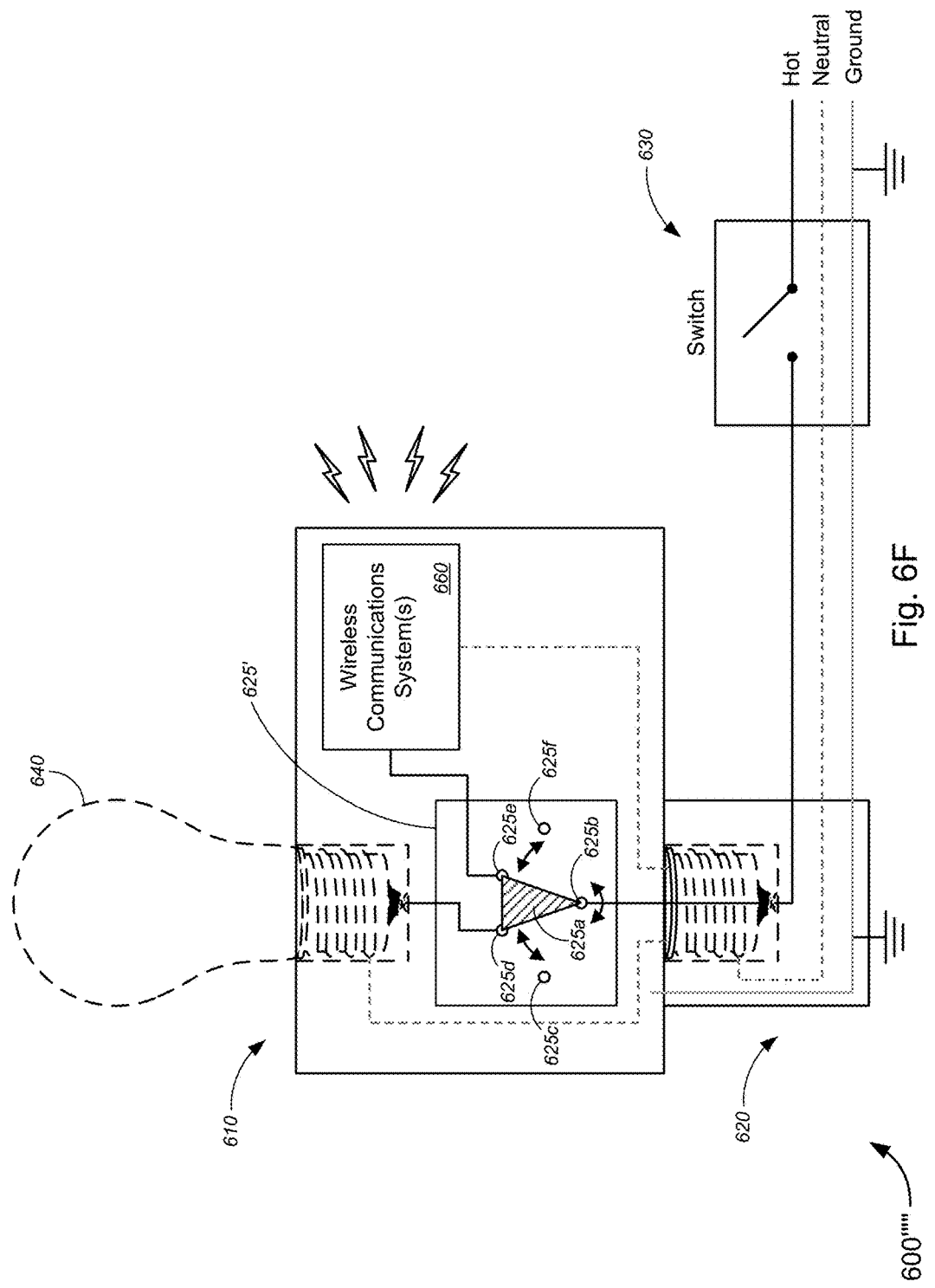

LIGHT SOCKET WIFI DEVICE

CROSS-REFERENCES TO RELATED APPLICATIONS

This application claims priority to U.S. Patent Application Ser. No. 62/369,574 (the "'574 application"), filed Aug. 1, 2016 by Charles I. Cook, entitled, "Light Socket WiFi Devices," the disclosure of which is incorporated herein by reference in its entirety for all purposes.

This application may be related to U.S. patent application Ser. No. 15/393,532 (the "'532 application"), filed Dec. 29, 2016 by Michael L. Elford et al., entitled, "Distributed Broadband Wireless Implementation in Premises Electrical Devices," which claims priority to U.S. Patent Application Ser. No. 62/384,014 (the "'014 application"), filed Sep. 6, 2016 by Michael L. Elford et al., entitled, "Distributed Broadband Wireless Around Home Electrical Devices," the disclosure of each of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatuses, and/or computer software for implementing wireless radio functionality, and, in particular embodiments, to methods, systems, apparatuses, and/or computer software for implementing wireless radio functionality through devices that are compatible with light sockets. The present disclosure further relates, in general, to methods, systems, and apparatuses for implementing a three-terminal power connection light socket, and, in particular embodiments, to methods, systems, apparatuses, and/or computer software for implementing either a two-terminal or a three-terminal power connection light socket to power a wireless radio device (such as an access point).

BACKGROUND

While a wide variety of devices that provide wireless radio services such as WiFi are available, the use of such devices typically requires a dedicated source of electric power. The dedicated source of electric power may be provided either by direct current ("D/C") (such as battery power, power over Ethernet ("PoE"), etc.) or by alternating current ("A/C"), generally provided by a direct or corded connection with a wall outlet.

Each of these solutions presents limitations. Using D/C for power generally requires either replacement or recharging of batteries or additional hardware to provide PoE, while the use of A/C for power severely limits the location of wireless radios due to safety and aesthetic concerns.

Further, in a typical A/C power case, a wireless radio (such as an access point) will need to be located near a wall outlet; otherwise, extension cords will be necessary. Wall outlets are typically each located a few inches above a floor in a fixed location. As a result, when a wireless radio is located near such an outlet, the propagation pattern of the wireless radio signal is constrained and the wireless radio signal does not propagate well throughout a room of a residential building or a commercial building. Thus, users attempting to receive the radio signals on their devices, such as computers, tablets, radios, cell phones, and/or the like, may experience intermittent and inconsistent transmission of wireless radio signals to their devices, and may experience breaks in receiving wireless radio service.

Hence, there is a need for more robust and scalable solutions for powering wireless radios (such as in an access point or the like).

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 6A-6F are schematic diagrams illustrating various systems for implementing wireless radio functionality using a device that is compatible with a light socket, in accordance with various embodiments.

DETAILED DESCRIPTION OF CERTAIN EMBODIMENTS

Overview

Figure 1A:
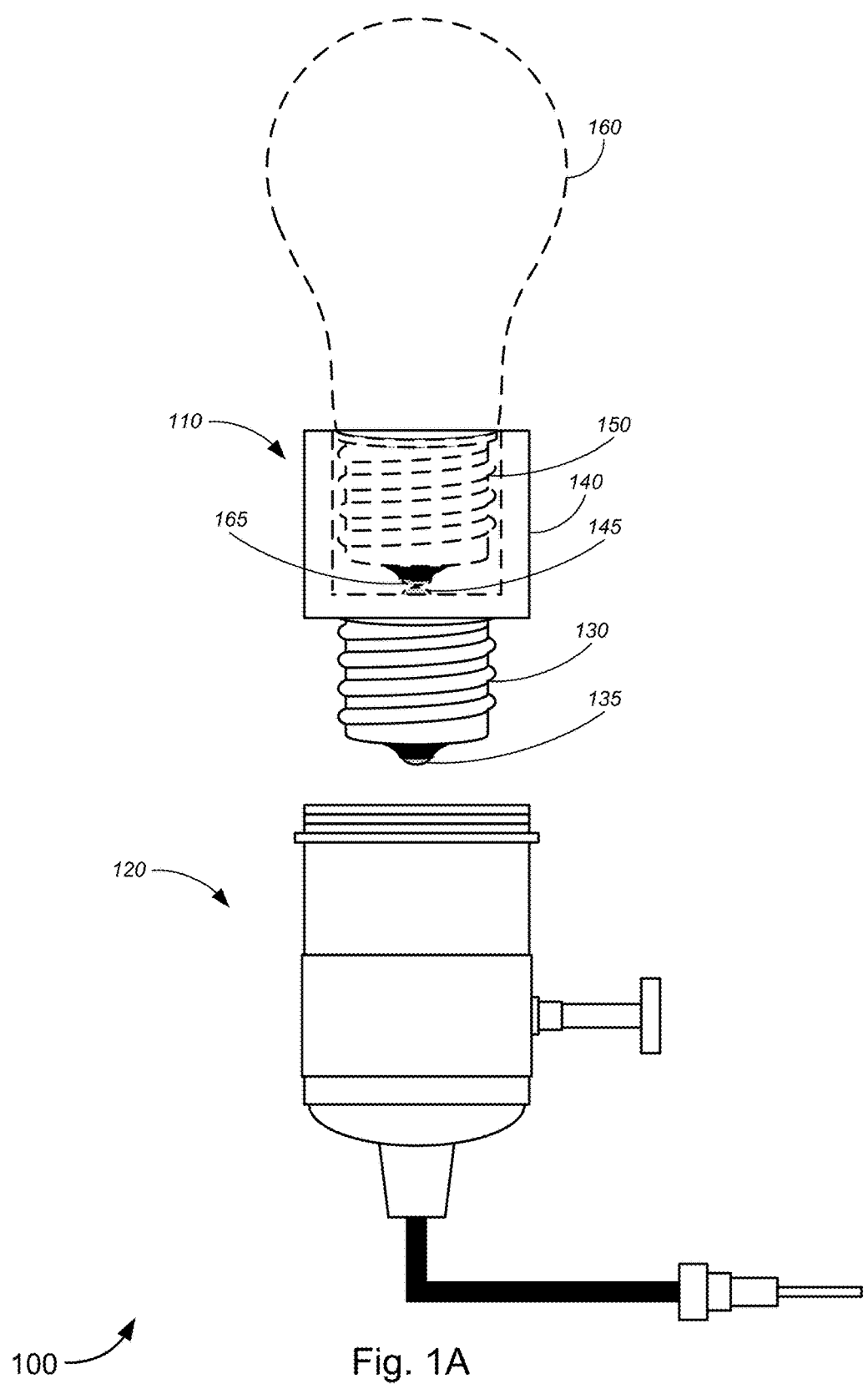
FIGS. 1A and 1B are schematic diagrams illustrating a system for implementing wireless radio functionality using a device that is compatible with a light socket and the device that is compatible with a light socket, respectively, in accordance with various embodiments.

Various embodiments provide improved techniques for implementing wireless radio functionality, including, without limitation, solutions for implementing wireless radio functionality through devices that are compatible with light sockets.

In a particular aspect of some embodiments, a device with a wireless radio may be implemented to provide wireless radio services to a home or commercial building. The device might be configured to be inserted into a light bulb receptacle (often referred to as a "light socket"). By inserting the device with wireless radio functionality into a light socket, the communications device may be positioned several feet above the floor, in (and/or attached to) the light bulb receptacle and a user may use the device to effectively and efficiently provide wireless radio services to a home or commercial building.

Various embodiments further provide techniques for implementing a three-terminal power connection light socket, including, without limitation, solutions for implementing a three-terminal power connection light socket to power a wireless radio device (such as an access point).

In a particular aspect of some embodiments, a three-terminal power connection light socket receptacle may be provided to power a device with a wireless radio. By providing a light socket that has a three-terminal power connection, the bandwidth capabilities of the device with the wireless radio may be significantly increased, as all conductors or wires in an electrical cable (e.g., a 14-2 cable (consisting of a hot wire, a neutral wire, and a ground wire), or a 14 AWG wire, or the like) or three conductors or wires in "three-wire cables" (e.g., a 14-3 cable (consisting of two hot wires, a neutral wire, and a ground wire), or the like) can be used to transmit data for power line communications ("PLC") as opposed to only using two conductors or wires in a single cable in two-terminal power connection light sockets.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network configuration technology, network access technology, and/or the like. In other aspects, certain embodiments can improve the functioning of user equipment or systems for implementing wireless radio functionality. For example, certain embodiments provide enhanced efficiency and/or efficacy for propagating radio signals throughout a room of a house or a building. For instance, by providing a wireless radio in a device that is configured to be inserted into a light socket (which may be one of a threaded type, a plug-in type, a twist and lock type, a pin type, or a prong type, and/or the like), the device may be located several feet above a floor, located on a table, or located in a ceiling light or lamp. By locating the device (with integrated non-wired communications device(s)) several feet above the floor or in the ceiling, instead of a couple inches above the floor, the propagation pattern of the wireless radio signal is able the effectively spread throughout a room of a house or a building. Alternatively, or additionally, external antennas may be implemented with such a device; such external antennas could be fastened to the device itself, could be fastened to a wall or ceiling, or could be draped around a lighting fixture, or could be allowed to hand down (e.g., like a pull-string on a pull-string actuated light fixture), or the like. Thus, users attempting to receive radio signals on their devices, such as computers, tablet computers, smart phones, mobile phones, laptop computers, portable gaming devices, radios, and/or the like, will experience more effective and consistent wireless radio service.

Further, certain additional embodiments provide a three-terminal A/C power connection through a light socket. A three-terminal A/C power connection through a light socket may increase the bandwidth capabilities of the wireless radio functionality device. Thus, the functionalities described in the above embodiments extend beyond mere conventional computer processing operations. These functionalities produce tangible results outside of the implementing computer system, including, merely by way of example, improved functionality of networks and/or the like, at least some of which may be observed or measured by customers and/or service providers.

Merely by way of example, a device in accordance with one set of embodiments might comprise a light socket attachment configured to be inserted into (or that mates with) a light socket receptacle of a lighting device (e.g., ceiling, floor, and/or table light and/or lamp, or the like) when the light socket attachment is removably coupled to the lighting device, a communications system comprising a non-wired communications device, and a light bulb receptacle configured to receive a light bulb. The device may further comprise circuitry configured to receive (or that receives) electric power through the light socket attachment. The circuitry may direct a specified amount of power from the received electric power to the communications system while directing remaining power of the received electric power to the light bulb receptacle.

The communications system may function as at least one of a wireless access point, a wireless repeater, a wireless client, and/or the like. The communications system may further be in communication with and/or communicatively coupled to a local area network ("LAN") and/or a service provider network. The non-wired communications device might comprise one of a wireless radio or a light-based communications device, or the like. The wireless radio may comprise one of a WiFi radio, a cellular communications transceiver, or a Bluetooth transceiver, and/or the like. The light-based communications device might comprise a Li-Fi communications device, or the like.

The communications system of the device might comprise at least one of a wired communications adapter or a wireless communications adapter, or the like. The wired communications adapter may provide a Power-Line Communications ("PLC") link with the communications system. In some cases, the PLC link may be at least one of a two-terminal A/C power connection and/or a three-terminal A/C power connection. For a PLC link, the bandwidth capability of the PLC transceiver can be nearly doubled if a three-terminal versus a two-terminal power connection is used (as described herein). The PLC link, according to some embodiments, may be based on at least one of G.hn specification, HomePlug specification, and/or the like. According to some embodiments, the wireless communications adapter may provide backhaul functionality (in some cases, to a local LAN or the like).

In some embodiments, the light bulb may comprise a lighting element. The light bulb may be any size and/or type of light bulb, and the lighting element may include, but is not limited to, at least one of a light-emitting diode, an incandescent lighting element, a fluorescent lighting element, and/or the like. According to some embodiments, the light socket attachment and the light bulb receptacle might be compatible with one of a threaded attachment configuration, a plug-in attachment configuration, a twist and lock attachment configuration, a pin attachment configuration, or a prong attachment configuration, and/or the like. The lighting element may be compatible with at least one of a two-terminal power source and/or three terminal power source. The light bulb receptacle of the device may be configured to receive a light bulb that is compatible with at one of a two-terminal power source and/or a three-terminal power source. The light bulb receptacle may further be configured to receive any size or type of light bulb.

Merely by way of example, in some embodiments, the device might further comprise one or more sensors. The one or more sensors might comprise at least one of one or more proximity sensors, one or more motion sensors, one or more sound sensors, or one or more ambient light sensors, and/or the like. The circuitry might direct the remaining power of the received electric power to the light bulb receptacle in response to receiving predetermined signals from the one or more sensors.

Another aspect, according to certain embodiments, provides a method comprising providing a device comprising a light socket attachment configured to be inserted into (or that mates with) a light socket receptacle of a lighting device (e.g., ceiling, floor, and/or table light and/or lamp, or the like) when the light socket attachment is removably coupled to the lighting device, a communications system comprising a non-wired communications device, a light bulb receptacle configured to receive (or that receives) a light bulb, and/or circuitry. The circuitry of the device may be configured to receive (or that receives) electric power through the light socket attachment. The circuitry may further be configured to direct (or that directs) a specified amount of power from the received electric power to the communications system and to direct (or that directs) remaining power of the received electric power to the light bulb receptacle. The method may further comprise inserting the light socket attachment of the device into the light socket receptacle. Additionally and/or alternatively, the method may comprise inserting the light bulb into the light bulb receptacle.

The communications system of the device may function as at least one of a wireless access point, a wireless repeater, a wireless client, and/or the like. The communications system may further be in communication with and/or communicatively coupled to a local area network ("LAN") and/or a service provider network. The non-wired communications device might comprise one of a wireless radio or a light-based communications device, or the like. The wireless radio of the communications system may be one of a WiFi radio, a cellular communications transceiver, or a Bluetooth transceiver, or the like. The light-based communications device might be a Li-Fi communications device, or the like.

A further aspect according to certain embodiments provides a method for providing electric power to a device. The method may comprise providing a device comprising a light socket attachment configured to be inserted into (or that mates with) a light socket receptacle of a lighting device (e.g., ceiling, floor, and/or table light and/or lamp, or the like) when the light socket attachment is removably coupled to the light device, a communications system comprising a processor and/or a non-wired communications device, a light bulb receptacle configured to receive (or that receives) a light bulb, and/or circuitry. The circuitry may be configured to receive (or that receives) electric power through the light socket attachment. The circuitry may further be configured to direct a specified amount of power from the received electric power to the communications system and to direct (or that directs) remaining power of the received electric power to the light bulb receptacle. The method may further comprise inserting the light socket attachment of the device into the light socket receptacle of the lighting device (i.e., the ceiling, floor, and/or table light and/or lamp, or the like). Additionally and/or alternatively, the method may comprise inserting the light bulb into the light bulb receptacle.

Next, the method may further comprise directing electric power from the light socket receptacle to the light socket attachment. A processor of the communications system may then determine the specified amount of electric power to be directed to the communications system. Once a specified amount of electric power is determined, the determined specified amount of electric power may be directed by the processor through the circuitry to the communications system. The remaining electric power (i.e., the electric power that is not used to power the communications system) may then be directed by the processor through the circuitry to the light bulb receptacle of the device to power the light bulb that may be received in the light bulb receptacle of the device.

The communications system of the device may further comprise at least one of a wired communications adapter or a wireless communications adapter, or the like. The wired communications adapter may provide a Power-Line Communications ("PLC") link with the communications system. The PLC link may be at least one of a two-terminal A/C power connection and/or a three-terminal A/C power connection. For PLC, the bandwidth capability of the PLC transceiver can be nearly doubled if a three-terminal versus a two-terminal power connection is used (as described herein). The PLC link may be based on at least one of G.hn specification, HomePlug specification, and/or the like. In some embodiments, the wireless communications adapter may provide backhaul functionality.

Merely by way of example, according to some embodiments, the device might further comprise one or more sensors. The one or more sensors might comprise at least one of one or more proximity sensors, one or more motion sensors, one or more sound sensors, or one or more ambient light sensors, and/or the like. The method might further comprise monitoring, with the one or more sensors, an area surrounding the lighting device; and, in response to exceeding predetermined sensor threshold levels, sending, with the one or more sensors, a signal to the circuitry; wherein the circuitry directs the remaining power of the received electric power to the light bulb receptacle in response to receiving the signal from the one or more sensors.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of a method, system, and/or apparatus for implementing wireless radio functionality, and, in particular, for implementing wireless radio functionality through devices that are compatible with light sockets. FIGS. 1-6 further illustrate some of the features of a method, system, and/or apparatus for implementing a three-terminal power connection light socket, and, in particular, for implementing a three-terminal power connection light socket to power a wireless radio device (such as an access point). The methods, systems, and/or apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

Figure 1B:
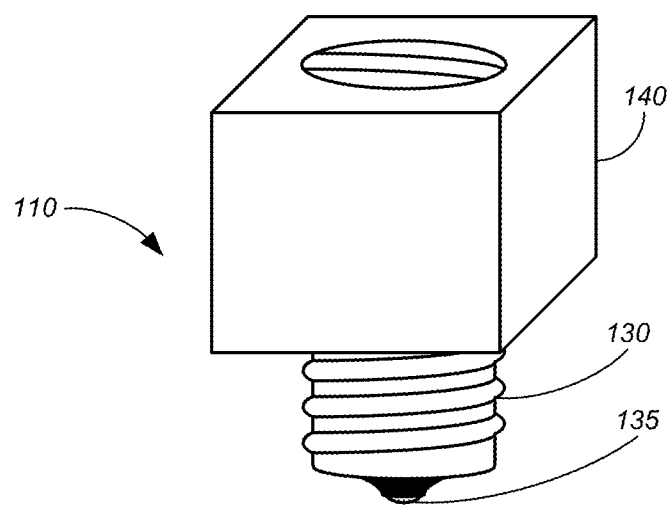

With reference to the figures, FIGS. 1A and 1B (collectively, "FIG. 1") are schematic diagrams illustrating a system 100 for implementing wireless radio functionality using a device 110 that is compatible with a light bulb receptacle 120 (also referred to herein as a "light socket" or "light socket receptacle"), in accordance with various embodiments. The light bulb receptacle 120 may be any receptacle—which may be compatible with one of a threaded attachment configuration, a plug-in attachment configuration, a twist and lock attachment configuration, a pin attachment configuration, or a prong attachment configuration, and/or the like—that is capable of receiving a lighting element or light bulb. For example, the light socket 120 may be provided or disposed within, or may otherwise be part of, at least one of a floor, table, or ceiling light or lamp.

The light socket 120 may further be configured to connect to a network such as a service provider network and/or a local area network via any local area network ("LAN") communications line including, but not limited to, a wireless communications link or a Power-Line Communications ("PLC") link. The light socket 120 may further be configured to provide a Power-Line Communications ("PLC") link to simultaneously carry both data and electric power to device 110.

The wireless radio functionality device 110 may comprise a light socket attachment 130, an external contact terminal 135, a communications device 140, an internal contact terminal 145, and a light bulb receptacle 150. The light socket attachment 130—which may be compatible with one of a threaded attachment configuration, a plug-in attachment configuration, a twist and lock attachment configuration, a pin attachment configuration, or a prong attachment configuration, and/or the like—may be configured to be compatible with any size or type of light socket 120. The light socket 120 may provide at least one of a two-terminal A/C power connection or three-terminal A/C power connection to device 110. Herein, "two-terminal" might generally refer to a two-way light socket connection or a two-way lighting circuit (i.e., a circuit that allows a single switch to control power to a single light socket) as understood by a person skilled in the art, while "three-terminal" might generally refer to one of a three-way light socket (which provides a plurality of discrete lighting level selections, typically three levels plus OFF (i.e., OFF, low, medium, and high), or the like) or a three-way light socket connection or a three-way lighting circuit (i.e., a circuit that allows two switches to control power to a single light socket) as understood by the person skilled in the art.

The light socket attachment 130 may be configured to be attached to, screwed into, and/or inserted into a corresponding light socket 120. The light socket attachment 130 may be configured to receive power from light socket 120. The light socket attachment 130 may be configured to receive at least one of a two-terminal A/C power source and/or a three-terminal A/C power source from light socket 120. The light socket attachment 130 may further be configured to direct power and/or data received from the light socket 120 into device 110, via the external contact terminal 135.

Figure 2:
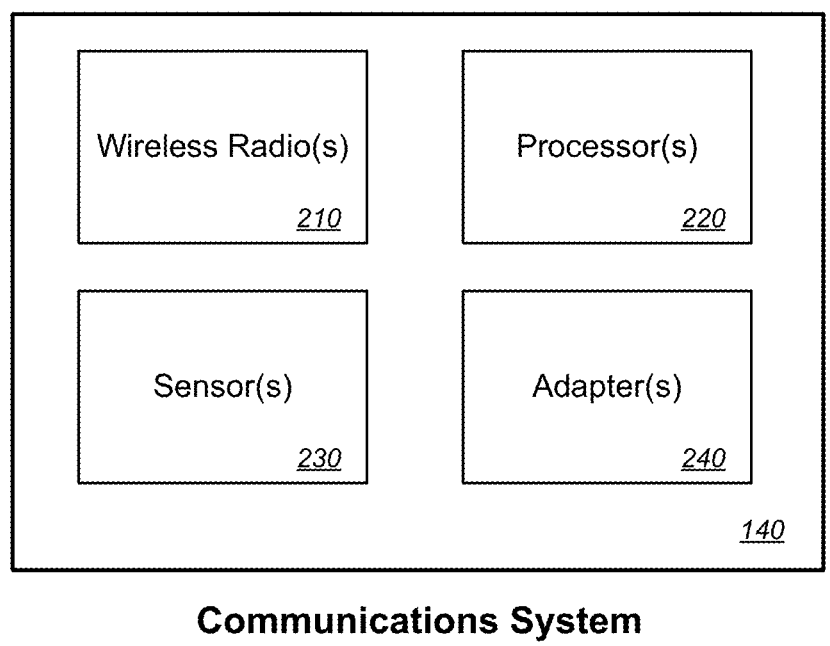
FIG. 2 is a schematic block diagram illustrating a communications system for implementing wireless radio functionality, in accordance with various embodiments.

The device 110 might further include, without limitation, a communications device or system 140. The communications system 140 may comprise a wireless radio 210 (as shown in FIG. 2) and a processor 220 (as shown in FIG. 2). The communications device or system 140 may function as at least one of a wireless access point, a wireless repeater, a wireless client, and/or the like. The device 110 and communications device or system 140 may be configured to connect to a network via any local area network ("LAN") technology including, but not limited to, a wireless communications link and/or a PLC link.

The communications device or system 140 may be configured to attach to the light socket 120 through the light socket attachment 130. The communications device or system 140 may receive power and/or data via a PLC link through the light socket attachment 130. The communications device or system 140 may also receive data wirelessly via a wireless communications link.

By screwing and/or inserting the communications device or system 140 (through the light socket attachment 130) into a light socket (such as light socket 120, or the like), several advantages may be realized. For example, the communications device or system 140 may be located several feet above the floor (instead of a few inches off the floor if the communications device or system 140 is connected to a power outlet or wall socket), e.g., in a floor lamp and/or light (with the light socket located about 3 to about 6 feet above the floor), in a table lamp and/or light (with the light socket located about 3 to about 5 feet above the floor), in a ceiling lamp and/or light (with the light socket located about 8 to about 15 feet, or more, above the floor), and/or the like. This positioning of the communications device or system 140 allows for more efficient and more effective propagation of wireless radio signals throughout a room in a home, building, or office. Thus, users attempting to receive the radio signals on their devices, such as computers, tablet computers, smart phones, mobile phones, laptop computers, portable gaming devices, radios, printers, and/or the like, will experience more effective and consistent wireless radio service (e.g., WiFi, LTE, etc.).

Figure 4:
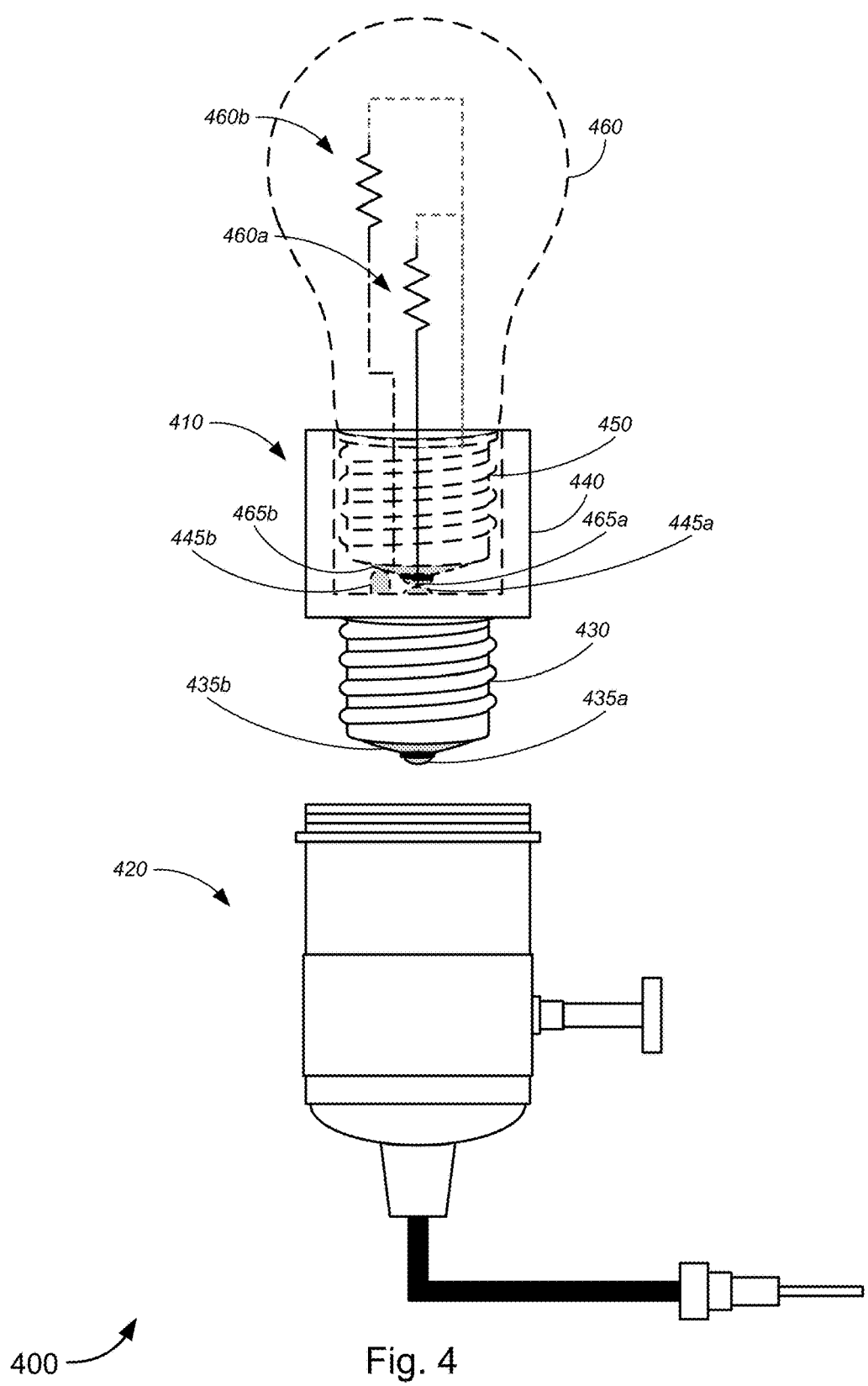
FIG. 4 is a schematic diagram illustrating a system for implementing a three-terminal power connection light socket, in accordance with various embodiments.
Figure 6B:
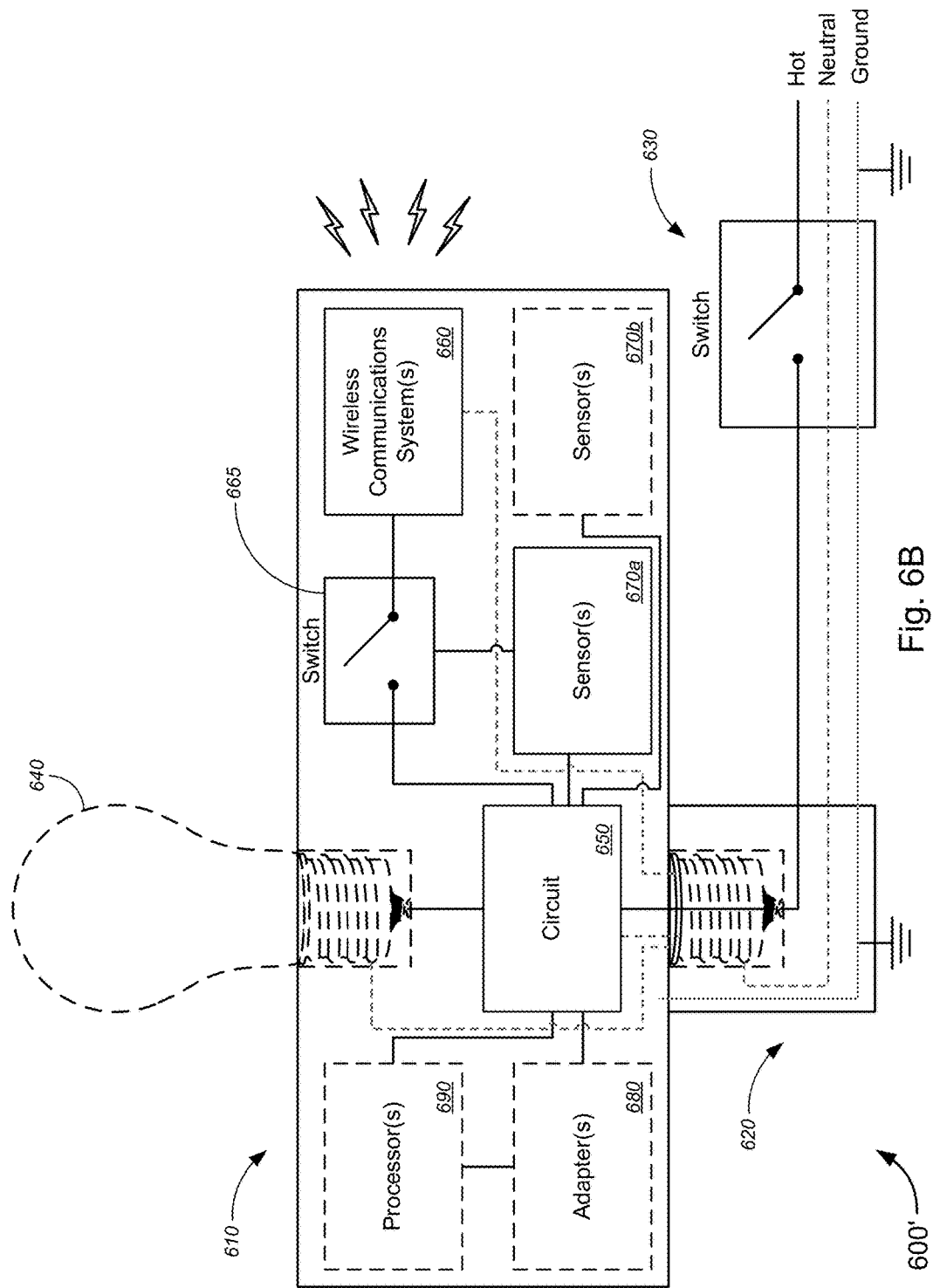
Figure 6C:
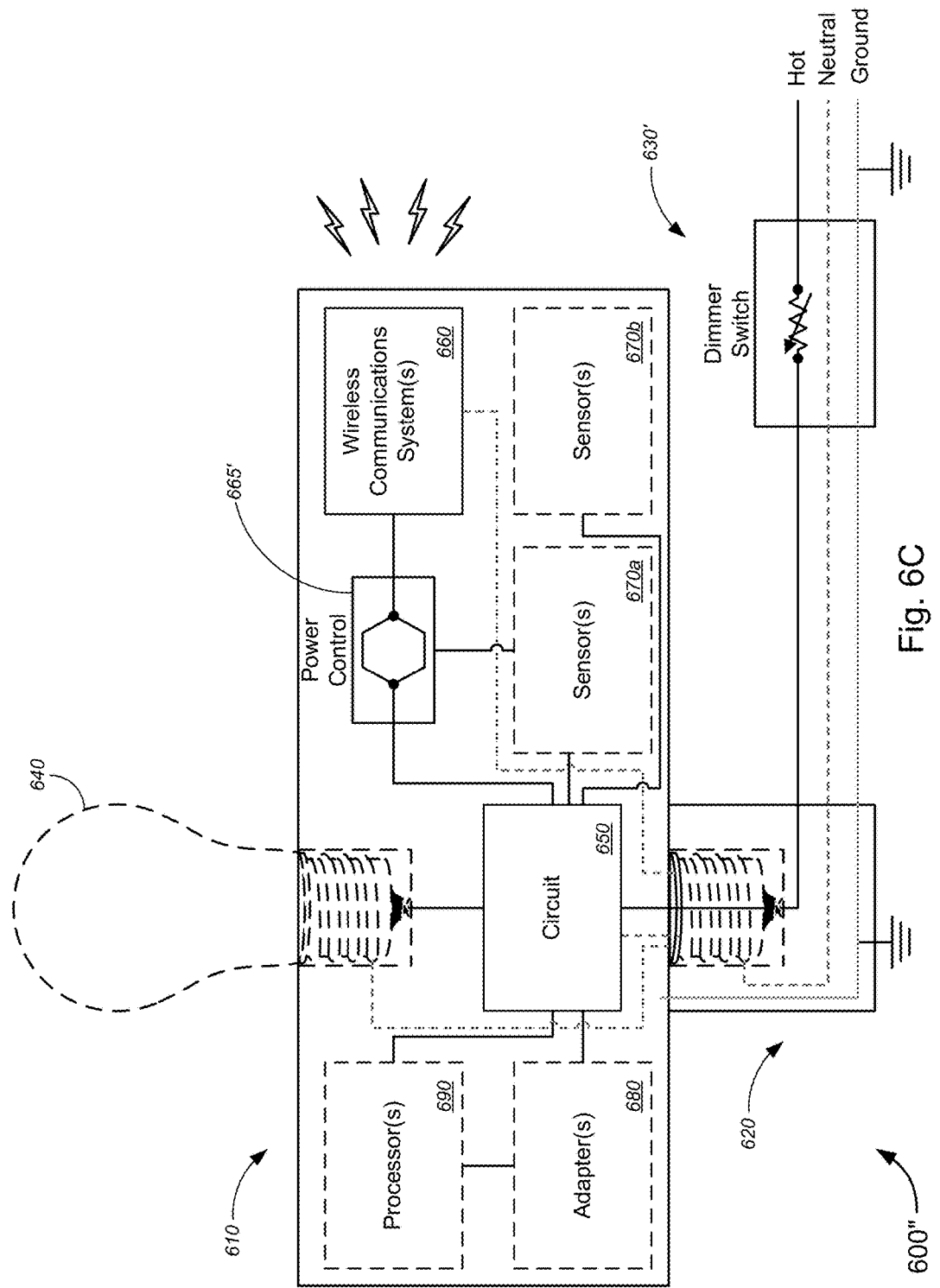
Figure 6D:
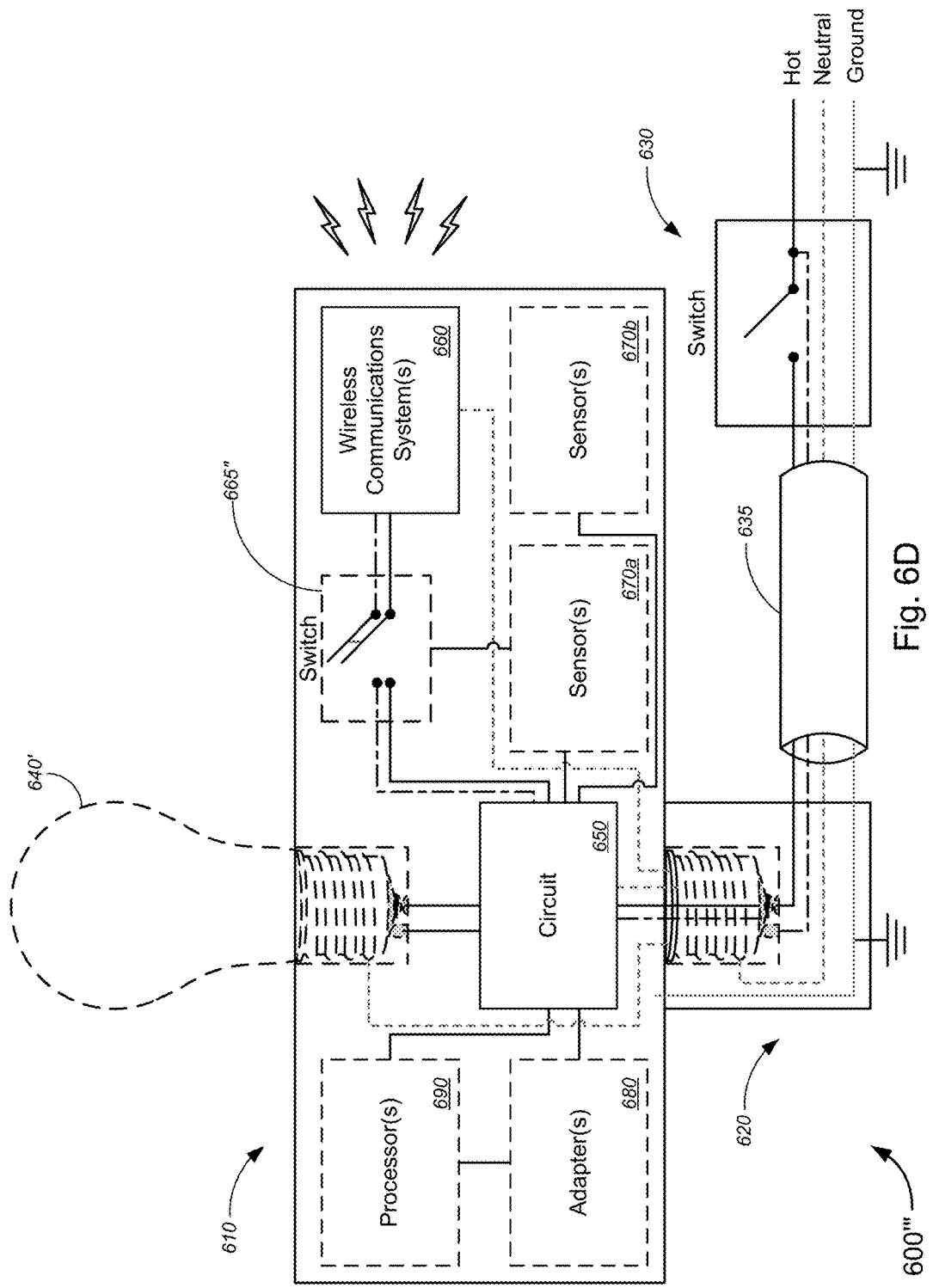
Figure 6E:
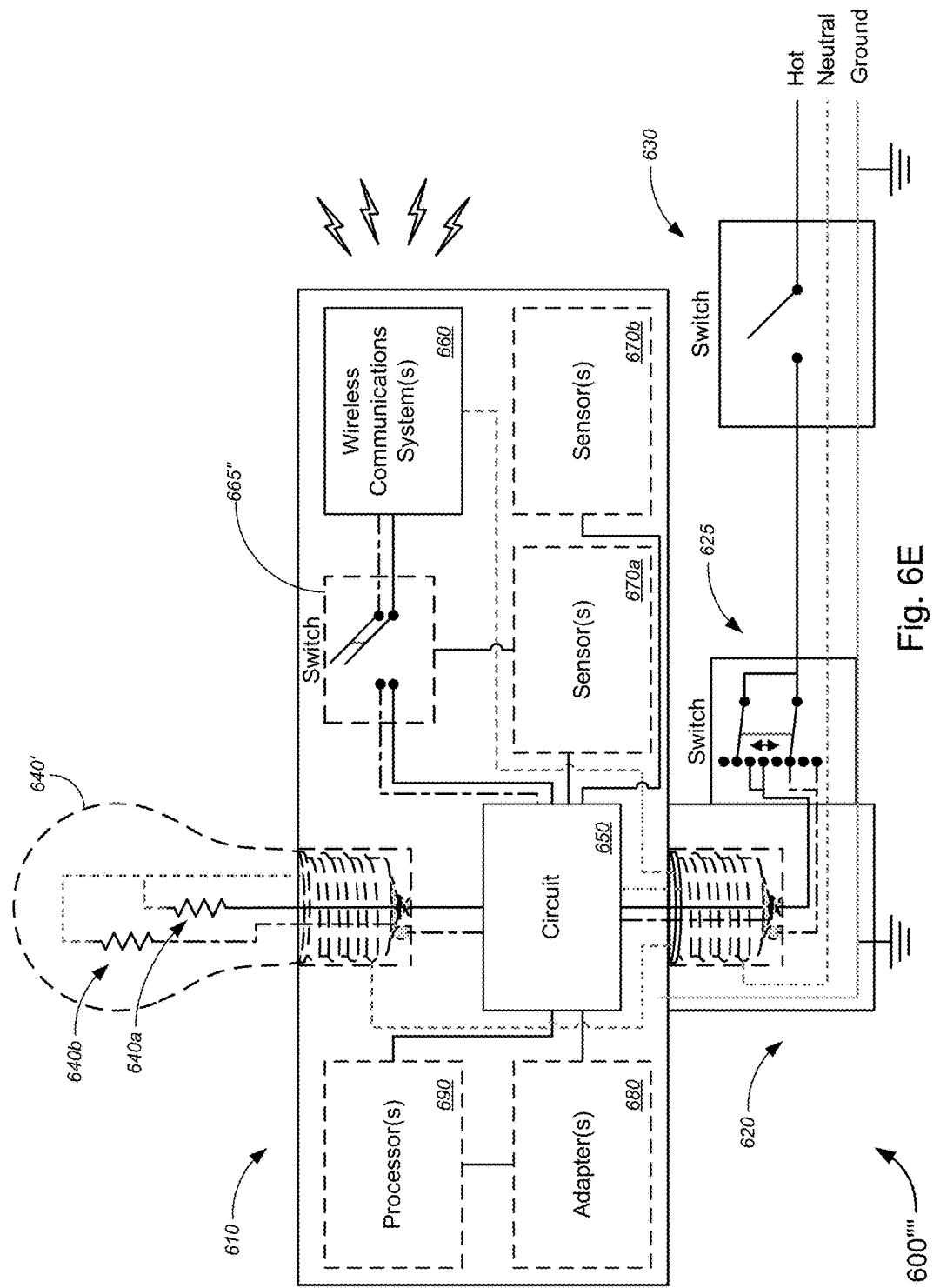

Further, if the connection between device 110 and the gateway or the service provider network is a PLC link (which may be an implementation of powerline communications specifications, including, but not limited to, G.hn specifications, HomePlug specifications (including, without limitation, HomePlug 1.0 specification, HomePlug AV specification, HomePlug AV2 specification, HomePlug Green PHY specification, HomePlug Access Broadband over Power Line ("BPL") specification, and/or the like), or other IEEE 1901 standard related specifications, and/or the like), the bandwidth capabilities of the wireless radio 210 may be significantly increased (almost doubled) by the use of a three-terminal power connection light socket 120 rather than a two-terminal power connection light socket 120 to power device 110, as described in detail below with respect to FIGS. 4 and 6E.

The device 110 featured in FIG. 1 might also include, without limitation, a light bulb receptacle 150 that is configured to receive a light bulb 160 (or a lighting element of a light bulb 160). However, the device 110 is not required to have the light bulb receptacle 150—instead, LEDs might be embedded or attached to a surface(s) of the device 110 to replace a traditional light bulb 160. The light bulb receptacle 150 of the device 110 may be configured to receive any type and size of light bulb including, but not limited to, light-emitting diodes ("LEDs") and/or fluorescent lights. Further, the light bulb receptacle 150 may be compatible with traditional two-terminal power connection light bulbs. Thus, the light bulb receptacle 150 may be configured to provide a two-terminal A/C power connection to the light bulb 160 (or lighting element of the light bulb 160), via the external contact terminal 135 and the internal contact terminal 145. When the light bulb 160 is fully inserted into light bulb receptacle 150, the internal contact terminal 145 makes electrical contact with contact terminal 165 of the light bulb 160.

The device 110 and the light bulb receptacle 150 may further be configured to provide different types of lighting functionality. For example, the device 110 may contain a plurality of sensors including, but not limited to, motion detection sensors, noise sensors, infrared sensors, and/or the like to detect when a person is in the same room as or in proximity to device 110. In some embodiments, the light bulb receptacle 150 of the device 110 may provide electric power to the light bulb 160 (or lighting element of the light bulb 160) only when one or more of the plurality of sensors detect that a person is in the same room as or in proximity to device 110.

According to some embodiments, the device 110 may further include sensors to detect whether the light bulb 160 (or lighting element of the light bulb 160) is present in the light bulb receptacle 150. The device 110 may only provide electric power to the internal contact terminal 145 when the sensors detect that a light bulb 160 is present in the light bulb receptacle 150 or when the sensors detect that a lighting element of the light bulb 160 is operational within the light bulb 160. Alternatively, if a light bulb 160 is not present (or if the lighting element in the form of a filament is broken or the like), an open circuit condition might automatically result in no electric power leading to the internal contact terminal 145.

The device 110 may also only provide electric power to the light bulb 160 when the sensors detect that a light bulb 160 is present in the light bulb receptacle 150 or when the sensors detect that a lighting element of the light bulb 160 is operational within the light bulb 160, and when the sensors detect that a person is in the same room as or in proximity to device 110. According to some embodiments, the sensors may also be used to control operation of the wireless communications device. For example, when the light switch is turned on, the wireless communications device could be one of always on or only on when the sensors detect presence of a person. In some cases, the wireless communications device and the light bulb can be independently controlled. In other words, the lighting device may turn on when the sensors detect presence of a person(s) and/or detect that the ambient light is low, whereas the wireless communications device either may be always on or may turn on if there is someone in the room regardless of the level of ambient light, and/or the like.

Figure 3:
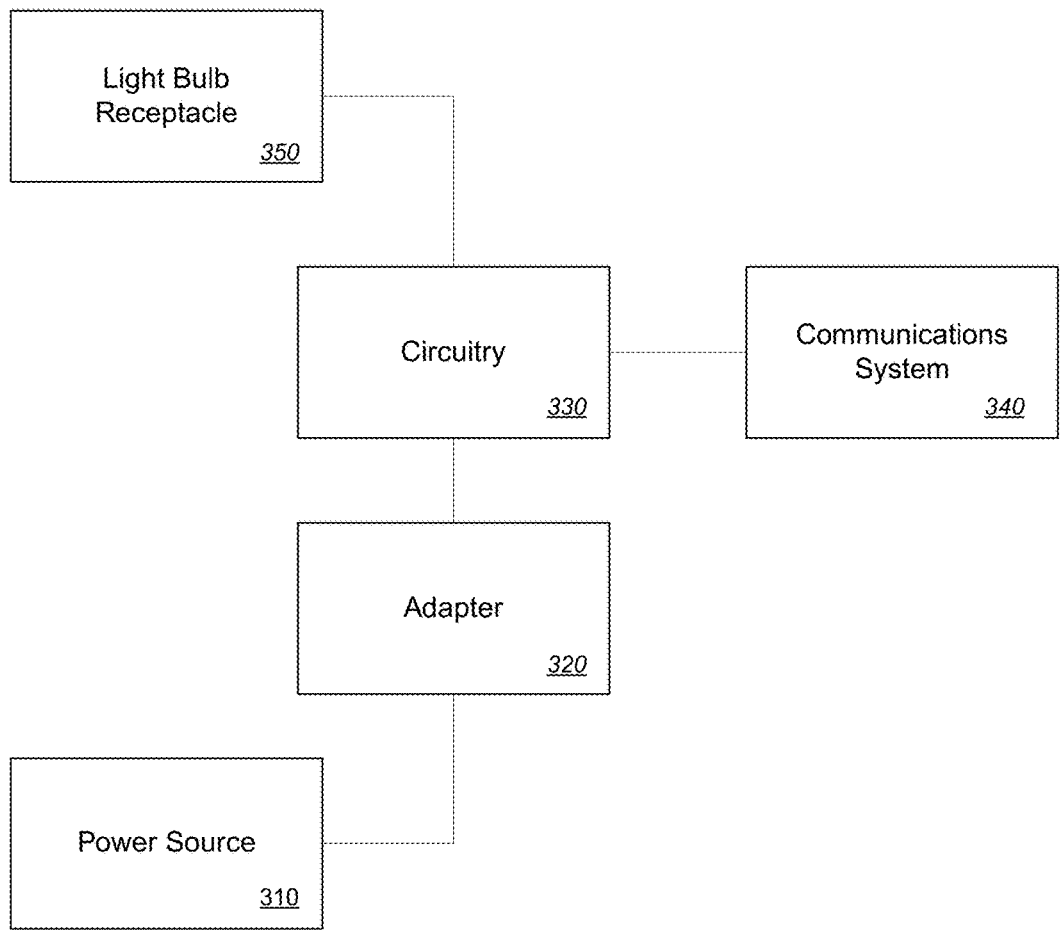
FIG. 3 is a schematic block diagram illustrating a circuitry subsystem for directing electric power through a wireless radio functionality device that is compatible with a light socket, in accordance with various embodiments.

The device 110 may also include electrical pathway or circuitry 330 (as shown in FIG. 3) configured to receive electric power through the light socket attachment 130. The circuitry may direct a specified amount of electric power to the communications system 140 and direct remaining current to the light bulb receptacle 150 (in general, or to the internal contact terminal 145 specifically). In some embodiments, passive circuit components (including, but not limited to, any combination of resistors, capacitors, inductors, regulators, potentiometers, and/or the like) may allow for passive direction of electric power to the communications system 140 and to the light bulb receptacle 150 (generally, or to the internal contact terminal 145 specifically). Alternatively, dynamic circuitry may be used that (in addition to the resistors, capacitors, inductors, regulators, potentiometers, and/or the like) might include switches and controllers (that receive sensor data from one or more of the various sensors described herein and control the switches and/or potentiometers (or other power regulation components) to deliver specified electric power to each of the communications system 140 and the internal contact terminal 145).

The various components of the device 110 of FIG. 1 may be incorporated within a single housing or body that includes the entirety of the light socket attachment 130, external contact terminal 135, communications system 140, internal contact terminal 145, light bulb receptacle 150, and circuitry 330; alternatively, the device 110 might comprise a plurality of components divided between two or more discrete housings.

Referring now to FIG. 2, FIG. 2 is a schematic block diagram illustrating a communications device or system 140 for implementing wireless radio functionality, in accordance with various embodiments. The various components of communications device or system 140 of FIG. 1 may be incorporated within a single housing that encloses the entirety of the communications device or system 140, including but not limited to, one or more wireless radios 210, one or more processors 220, one or more sensors 230, and/or one or more adapters 240. However, certain structural components of the communications device or system 140 may be relatively more integrated and/or separated. Thus, the communications device or system 140 depicted by FIG. 2 should be considered a set of functional components, which may or may not correspond to individual structures. Moreover, while certain functional components of an exemplary communications device or system 140 are illustrated by FIG. 2, the communications device or system 140 might have one or more components of a general purpose computer system, as described below with respect to FIG. 6.

The communications device or system 140 may function as at least one of a wireless access point, a wireless repeater, a wireless client, and/or the like. Communications device or system 140 may be configured to connect to a network (such as a service provider network or local area network) via any local area network ("LAN") technology including, but are not limited to, one of a wireless communications link or a PLC link.

As shown in the non-limiting example of FIG. 2, communications device or system 140 may comprise one or more wireless radios 210, one or more processors 220, one or more sensors 230, and/or one or more adapters 240. In some embodiments, the one or more wireless radios 210 may be WiFi radios, WiFi transceivers, and/or the like. The one or more wireless radios 210, according to some embodiments, might transmit and/or receive wireless broadband signals according to a set of protocols including, but not limited to, IEEE 802.11a/b/g/n/ac/ad/af/ax standards, Universal Mobile Telecommunications System ("UMTS"), Code Division Multiple Access ("CDMA"), Long Term Evolution ("LTE"), Personal Communications Service ("PCS"), Advanced Wireless Services ("AWS"), Emergency Alert System ("EAS"), and Broadband Radio Service ("BRS"), Bluetooth communications, and/or the like. The one or more wireless radios 210 may be configured to transmit and/or receive voice, data, and/or video signals to and/or from one or more wireless user devices (such as computers, tablet computers, smart phones, mobile phones, laptop computers, portable gaming devices, radios, printers, and/or the like).

The processors 220 may be in communication with and/or communicatively coupled to the wireless radio(s) 210, the sensor(s) 230, circuitry 330 (as shown in FIG. 3), and/or adapter(s) 240. The one or more sensors 230 may include, but are not limited to, motion detection sensors, noise sensors, infrared sensors, contact sensors, and/or the like.

A computer readable medium may be in communication with the one or more processors 220. The computer readable medium may have encoded thereon a set of instructions executable by the processor 220 to determine, based on input from the one or more sensors 230 (e.g., motion detection sensors, noise sensors, infrared sensors, and/or the like), whether a person is in the same room as or in proximity to communications device or system 140. Based on a determination that a person is in the same room as or in proximity to communications device or system 140, the instructions may direct the circuitry to send electric power to a light bulb receptacle to power a lighting element. Based on a determination that a person is not in the same room as communications device or system 140, the instructions may direct circuitry 330 to not direct electric power to the lighting element through the light bulb receptacle.

The computer readable medium may also have encoded thereon a set of instructions executable by the processor 220 to determine whether a light bulb 160 (or lighting element of light bulb 160) is located in a light bulb receptacle based on input from one or more sensors 230 (e.g., contact sensors, electrical sensors, and/or the like). Based on a determination that a light bulb 160 (or lighting element of light bulb 160) is located in a light bulb receptacle (or that a lighting element in the light bulb 160 is operational), the instructions may direct the circuitry to send electric power to the lighting element of the light bulb 160 through the light bulb receptacle 150 (generally, or through the internal contact terminal 145 specifically). Based on a determination that a light bulb (e.g., light bulb 160) is not located in the light bulb receptacle or that a lighting element of a light bulb (which is in electrical communication with the light bulb receptacle) is not operational, the instructions may direct the circuitry to not send electric power to the lighting element through the light bulb receptacle. Merely by way of example, in some cases, the processor 220, in response to receiving a signal from the one or more sensors 230 indicating that the lighting element of light bulb 160 is not operational, either might communicate via the wireless communications system with an online marketplace to order a new bulb(s) or might send a notification to a user associated with the customer premises or with the local network to take action. In some cases, the one or more sensors 230 may further determine whether the light bulb is one of present in the light bulb receptacle but not fully inserted, whether the light bulb is missing (i.e., not even partially inserted into the light bulb receptacle), whether the lighting element is burned out or otherwise non-functional, and/or the like.

The computer readable medium may also have encoded thereon a set of instructions executable by the one or more processors 220 to determine whether a person is in the same room as or in proximity to communications device or system 140 and whether a light bulb 160 is located in a light bulb receptacle (and whether a lighting element in light bulb 160 is operational) based on input from one or more sensors 230 (e.g., contact sensors and/or the like). Based on a determination that a person is in the room (or in proximity to the device 110) and a light bulb 160 is located in a light bulb receptacle (or that a lighting element in the light bulb 160 is operational), the instructions may direct the circuitry to send electric power to the lighting element of the light bulb 160 through the light bulb receptacle (generally or through the internal contact terminal specifically). Based on a determination that a person is not in the room (or not in proximity to the device) and/or the light bulb is not located in the light bulb receptacle (or that a lighting element in the light bulb is not operational), the instructions may direct the circuitry to not send electric power to the lighting element of the light bulb through the light bulb receptacle.

The computer readable medium may also have encoded thereon a set of instructions executable by the one or more processors 220 to determine a specified amount of electric power to send to the communications device or system 140 through the circuitry of the communications device or system 140. The specified amount of electric power (or power) may be determined by calculating the amount of power the communications device or system 140 needs to power the one or more wireless radios 210, the one or more processors 220, the one or more sensors 230, and/or the like. Based on a determination of the amount of electric power to send to the communications device or system 140 through the circuitry, the processor 220 may send the specified amount of electric power to the communications device or system 140 through the circuitry 330 (of FIG. 3) and send the remaining electric power to a light bulb receptacle through the circuitry 330 (of FIG. 3). Thus, both the communications device or system 140 (comprising one or more wireless radios 210) and a lighting element of light bulb 160 that is provided in a light bulb receptacle may be powered by an electric power provided by a light socket.

The communications device or system 140 may further comprise one or more adapters 240. The one or more adapters 240 may be one or more wired communications adapters that provide a PLC link to the communications device or system 140 through the light socket attachment 130. The one or more adapters 240 may further be used to convert a three-terminal A/C power source to a two-terminal A/C power source and provide a two-terminal power connection through a light bulb receptacle to a lighting element of a light bulb. The PLC link may be at least one of a two-terminal A/C power connection or a three-terminal A/C power connection. Further, the powerline communications link may include, but is not limited to, at least one of G.hn or HomePlugAC.

Referring now to FIG. 3, FIG. 3 is a schematic block diagram illustrating a circuitry subsystem 300 for directing electric power through a wireless radio functionality device 110 that is compatible with a light socket, in accordance with various embodiments. The various components of circuitry subsystem 300 of FIG. 3 may be incorporated within a single housing that encloses the entirety of the circuitry subsystem 300. However, certain structural components of the circuitry subsystem 300 may be relatively more integrated and/or separated. Thus, the circuitry subsystem 300 depicted by FIG. 3 should be considered a set of functional components, which may or may not correspond to individual structures.

Circuitry subsystem 300 may comprise a power source 310, an adapter 320, circuitry 330, communications device or system 340, and light bulb receptacle 350. Power source 310 may be provided by at least one of a D/C source (such as battery power, power over Ethernet ("PoE"), an A/C to D/C converter/adaptor, etc.) or an A/C source, generally provided by a direct or corded (i.e., wired) connection with a wall outlet. The power source 310 may also be power through a light socket. The one or more adapters 320 may be one or more wired communications adapters that provide a PLC link to the communications device or system 340 from the power source 310 through the light socket attachment.

The circuitry 330 may be used to deliver electric power from power source 310 through the one or more adapters 320 to the communications device or system 340 and to the light bulb receptacle 350 (in general, or the internal contact terminal specifically). In some embodiments, circuitry 330 might comprise passive circuit components (including, but not limited to, any combination of resistors, capacitors, inductors, regulators, potentiometers, and/or the like) that may allow for passive direction of electric power to the communications device or system 340 and to the light bulb receptacle 350 (generally, or to the internal contact terminal specifically). Alternatively, circuitry 330 might comprise dynamic circuitry that may be used and that (in addition to the resistors, capacitors, inductors, regulators, potentiometers, and/or the like) might include switches and controllers (that receive sensor data from one or more of the various sensors described herein and control the switches and/or potentiometers (or other power regulation components) to deliver specified electric power to each of the communications device or system 340 and the internal contact terminal of the light bulb receptacle 350)

The circuitry 330 may be used to connect the device 110 and/or communications device or system 340 to a network and/or to a power source 310. The communications device or system 340 of device 110 may be configured to connect to a local area network or service provider network via any local area network ("LAN") technology including, but not limited to, a wireless communications link or a powerline communications link, or the like. If a powerline communications link is used to connect the wireless radio to a network, the bandwidth capability of the wireless radio can be nearly doubled if a three-terminal A/C power connection is used versus a two-terminal A/C power connection, as described in detail below with respect to FIG. 4.

Referring now to FIG. 4, FIG. 4 is a schematic diagram illustrating a three-terminal power connection light-bulb receptacle system 400, in accordance with various embodiments. In the non-limiting example of FIG. 4, system 400 might comprise a device 410 that is compatible with a light socket receptacle 420 (also referred to herein as a "light socket" or "light socket receptacle"), in accordance with various embodiments. The light socket receptacle 420 may be any receptacle capable of receiving a lighting element or light bulb. Such a receptacle may be compatible with one of a threaded attachment configuration, a plug-in attachment configuration, a twist and lock attachment configuration, a pin attachment configuration, or a prong attachment configuration, and/or the like. For example, the light socket 420 may be provided or disposed within, or may otherwise be part of, at least one of a floor, table, or ceiling light or lamp.

The light socket 420 may further be configured to connect to a network such as a service provider network and/or a local area network via any local area network ("LAN") communications line including, but not limited to, a wireless communications link or a Power-Line Communications ("PLC") link. The light socket 420 may further be configured to provide a Power-Line Communications ("PLC") link to simultaneously carry both data and electric power to device 410.

The wireless radio functionality device 410 may comprise a light socket attachment 430, external contact terminals 435a and 435b (collectively, "external contact terminals 435"), a communications device 440, internal contact terminals 445a and 445b (collectively, "internal contact terminals 445"), and a light bulb receptacle 450. The light socket attachment 430 may be configured to be compatible with any size or type of light socket 420. The light socket 420 may provide at least one of a two-terminal A/C power connection or three-terminal A/C power connection to device 410.

The light socket 420 may be installed in a typical electrical box for light fixtures. Further, in order to accommodate the three-terminal light socket 420, floor, table, and/or ceiling lights or lamps may be wired to be compatible with a three-terminal A/C power source or power outlet and a three-terminal light socket 410.

The light socket attachment 430 may be configured to be attached to, screwed into, and/or inserted into a corresponding light socket 420. The light socket attachment 430 may be configured to receive power from light socket 420. The light socket attachment 430 may be configured to receive at least one of a two-terminal A/C power source and/or a three-terminal A/C power source from light socket 420. The light socket attachment 430 may further be configured to direct power and/or data received from the light socket 420 into device 410, via one or both of the external contact terminals 435.

The device 410 might further include, without limitation, a communications device or system 440. The communications system 440 may comprise a wireless radio 210 (as shown in FIG. 2) and a processor 220 (as shown in FIG. 2). The communications device or system 440 may function as at least one of a wireless access point, a wireless repeater, a wireless client, and/or the like. The device 410 and communications device or system 440 may be configured to connect to a network via any local area network ("LAN") technology including, but not limited to, a wireless communications link and/or a PLC link.

The communications device or system 440 may be configured to attach to the light socket 420 through the light socket attachment 430. The communications device or system 440 may receive power and/or data via a PLC link through the light socket attachment 430. The communications device or system 440 may also receive data wirelessly via a wireless communications link.

By inserting the communications device or system 440 (through the light socket attachment 430) into a light socket (such as light socket 420, or the like), several advantages may be realized. For example, the communications device or system 440 may be located several feet above the floor (instead of a couple inches off the floor if the communications device or system 440 is connected to a power outlet or wall socket), e.g., in a floor lamp and/or light (with the light socket located about 3 to about 6 feet above the floor), in a table lamp and/or light (with the light socket located about 3 to about 5 feet above the floor), in a ceiling lamp and/or light (with the light socket located about 8 to about 45 feet, or more, above the floor), and/or the like. This positioning of the communications device or system 440 allows for more efficient and more effective propagation of wireless radio signals throughout a room in a home, building, or office. Thus, users attempting to receive the radio signals on their devices, such as computers, tablet computers, smart phones, mobile phones, laptop computers, portable gaming devices, radios, printers, and/or the like, will experience more effective and consistent wireless radio service (e.g., WiFi, LTE, etc.).

Further, if the connection between device 410 and the gateway or the service provider network is a PLC link (which may be an implementation of G.hn, HomePlugAC, and/or the like), the bandwidth capabilities of the wireless radio 210 may be significantly increased (almost doubled) by the use of a three-terminal power connection light socket 420 rather than a two-terminal power connection light socket 420 to power device 410, as all conductors or wires in an electrical cable (e.g., a 14-2 cable (consisting of a hot wire, a neutral wire, and a ground wire), or a 14 AWG wire, or the like) or three conductors or wires in "three-wire cables" (e.g., a 14-3 cable (consisting of two hot wires, a neutral wire, and a ground wire), or the like) can be used to transmit data for PLC as opposed to only using two conductors or wires in a single cable in two-terminal power connection light sockets. This is similar to the principle of multiple-input multiple-output ("MIMO") that is used in later versions of the WiFi standard and other wireless technologies to increase bandwidth. For example, in a 2×2 MIMO system with antennas located at corners (i.e., A, B, C, and D) of a square or rectangular configuration, two transmitters might be located at corners A and B with two receivers located at corners C and D. The transmitter at corner A might transmit signals over two channels—i.e., over a channel between A and C and over a channel between A and D. Likewise, the transmitter at corner B might transmit signals over two channels—i.e., over a channel between B and C and over a channel between B and D. Hence, there are four channels over which signals can be sent/received. In a two-terminal system of the various embodiments herein, three wires may be used to send PLC communications—specifically, a "hot" or "live" wire and a "neutral" wire (as shown in greater detail in the non-limiting example of FIG. 6A or 6B). A third wire (i.e., a "ground" or "bare" wire), which is also connected to earth ground, is typically connected to any metal parts in an appliance (in this case, in the light fixture, light switch, or the like), and typically serves only as a safety feature to prevent shock hazard in the event of a short circuit between the neutral wire and one or more of the hot wires. In some embodiments, each of the "hot," "neutral," and "ground" wires can be used to transmit data, with the "hot" and "neutral" wires carrying data to the wireless communications system and the "ground" wire serving as a common return data path. With the "ground" wire acting as the common return path for data between the "hot" wire and the "neutral" wire, two "channels" may result to carry the PLC data signals, thereby achieving a theoretical doubling of the bandwidth. As there may be some losses due to imbalances between the two "channels," the effective bandwidth would be reduced to less than a full 2 times bandwidth compared to a two-wire (or two terminal system), in which there is only one "hot" wire and one "neutral" wire. Older buildings and houses may be wired with only two conductors or wires in its electrical cables, a "hot" and a "neutral" wire, with no "ground" wire. In practice this is no longer acceptable in construction for safety reasons. In general, a cable with a designation of 14-2 (or the like) is a cable that contains three 14 AWG wires—i.e., one "hot" wire, one "neutral" wire, and one "bare" or "ground" wire. Consequently, most house wiring will use three conductor cables (which are sometimes referred to as "two-wire cables", as the "ground" wire is typical used only as a safety feature, as described above (although some refer to such cables as "three-wire" cables), while the "hot" and "neutral" wires are used to provide the electrical power and return paths) and will, in a modified state, be able to benefit from transmitting PLC over all three conductors. In some embodiments, a fourth wire, if available, can also be used to support yet another additional channel to further increasing the bandwidth capability of the system. In such embodiments, a cable with a designation of 14-3 (or the like) can be used, such cable containing four 14 AWG wires—i.e., two "hot" wire, one "neutral" wire, and one "bare" or "ground" wire. Such cables are sometimes referred to as "three-wire" cables as the "ground" wire is typically only used as a safety feature, as described above (although some refer to such cables as "four-wire" cables), while each of the two "hot" wires and the "neutral" wires are used to provide the electrical power and return paths. According to some embodiments, all four wires may be used to transmit data, with the each of the two "hot" wires and the "neutral" wires providing the data path to the wireless communications system, while the "ground" wire serves as a common or shared data return path, and thus will be able to benefit by further bandwidth capacity from transmitting PLC data over all four conductors.

The device 410 featured in FIG. 4 might also include, without limitation, a light bulb receptacle 450 that is configured to receive a light bulb 460 (or a lighting element of a light bulb 460). However, the device 410 is not required to have the light bulb receptacle 450—instead, LEDs might be embedded or attached to a surface(s) of the device 410 to replace a traditional light bulb 460. The light bulb receptacle 450 of the device 410 may be configured to receive any type and size of light bulb including, but not limited to, light-emitting diodes ("LEDs"), incandescent lights, and/or fluorescent lights, or the like. Further, the light bulb receptacle 450 may be compatible with traditional two-terminal power connection light bulbs. Thus, the light bulb receptacle 450 may be configured to provide a two-terminal A/C power connection to the light bulb 460 (or lighting element of the light bulb 460), via one or both of the external contact terminals 435 and one or more of the internal contact terminals 445. When the light bulb 460 is fully inserted into receptacle 450, only terminal 445a of the internal contact terminals 445 makes electrical contact with corresponding contact terminal of the light bulb (similar to single terminal 165 of light bulb 160 of FIG. 1 or the like).

Similar to conventional three-way light bulb sockets or devices, contact by a first contact terminal 465a (which is typically at the tip of the base of a threaded portion of light bulb 460 such as shown in the non-limiting example of FIG. 4, and is typically electrically isolated from each of a second contact terminal 465b and the grounded portion that is the threaded segment of the threaded portion; in non-threaded type bulbs, two contact terminals each electrically isolated from each other and from a grounded portion may be implemented in a similar manner) with (or electrical power through) only a first internal contact terminal 445a might close the circuit for a medium-power (or medium-wattage) lighting element 460a within a three-way light bulb 460, while contact by the second contact terminal 465b with (or electrical power through) only a second internal contact terminal 445b might close the circuit for a low-power (or low-wattage) lighting element 460b within the three-way light bulb 460, and contact by the first contact terminal 465a with (or electrical power through) the first internal contact terminal 445a simultaneously with contact by the second contact terminal 465b with (or electrical power through) the second internal contact terminal 445b might close both circuits within the three-way light bulb 460, resulting in an effective high-power (or high-wattage) lighting element causing illumination (in actuality, a sum of the illumination from each of the medium-wattage and the low-wattage lighting elements 460a and 460b).

In conventional three-way light bulb sockets or devices, such contact might be achieved by physical movement of equivalents of the corresponding one or more of the internal contact terminals 445. The various embodiments of system 400, however, are not limited to only physical movement to achieve electrical contact. Rather, physical movement of corresponding one or more of the internal contact terminals 445—which may be controlled by, e.g., circuitry (such as circuitry 330 of FIG. 3, or the like) and one or more processors (such as the one or more processors 220 of FIG. 2, or the like), in some cases, based on sensor data obtained by one or more sensors (such as the one or more sensors 230 of FIG. 2, or the like)—is merely one of the embodiments possible with the device 410. In alternative embodiments, sensors (such as sensors 220 of FIG. 2, or the like) might detect whether, and which of, one or both of the external contact terminals 435 are receiving electric power from corresponding contacts in the light socket 420 (which would be similar to conventional three-way light bulb sockets or devices as described above). The processors (such as the one or more processors 220 of FIG. 2, or the like) might, based on such detection by the sensors, cause the circuitry (such as circuitry 330 of FIG. 3, or the like) to provide corresponding electric power (or power) to corresponding one or more of the internal contact terminals 445, by electrical switching rather than physical movement of the internal contact terminals 445 themselves. The device 410 is also compatible with standard two-way light bulbs, such as light bulb 160 of FIG. 1, where only electrical connection with the first external contact terminal 445a might provide power to the light bulb for causing the lighting element of such two-way light bulb to illuminate.

The device 410 and the light bulb receptacle 450 may further be configured to provide different types of lighting functionality. For example, the device 410 may contain a plurality of sensors including, but not limited to, motion detection sensors, noise sensors, infrared sensors, and/or the like to detect when a person is in the same room as or in proximity to device 410. In some embodiments, the light bulb receptacle 450 of the device 410 may provide electric power to the light bulb 460 (or lighting element of the light bulb 460) only when one or more of the plurality of sensors detect that a person is in the same room as or in proximity to device 410.

According to some embodiments, the device 410 may further include sensors to detect whether the light bulb 460 (or lighting element of the light bulb 460) is present in the light bulb receptacle 450. The device 410 may only provide electric power to the internal contact terminals 445 when the sensors detect that a light bulb 460 is present in the light bulb receptacle 450 or when the sensors detect that a lighting element of the light bulb 460 is operational within the light bulb 460. Alternatively, if a light bulb 460 is not present (or if the lighting element in the form of a filament is broken or the like), an open circuit condition might automatically result in no electric power leading to the internal contact terminals 445.

The device 410 may also only provide electric power to the light bulb 460 when the sensors detect that a light bulb 460 is present in the light bulb receptacle 450 or when the sensors detect that a lighting element of the light bulb 460 is operational within the light bulb 460, and when the sensors detect that a person is in the same room as or in proximity to device 410.

As described above, the device 410 may also include electrical pathway or circuitry 330 (as shown in FIG. 3) configured to receive electric power through the light socket attachment 430. The circuitry may direct a specified amount of electric power to the communications system 440 and direct remaining current to the light bulb receptacle 450 (in general, or to one or more of the internal contact terminals 445 specifically). In some embodiments, passive circuit components (including, but not limited to, any combination of resistors, capacitors, inductors, regulators, potentiometers, and/or the like) may allow for passive direction of electric power to the communications system 440 and to the light bulb receptacle 450 (generally, or to one or more the internal contact terminals 445 specifically—in this case, relying on a direct electrical connection between contacts 435a and 465a and a direct electrical connection between contacts 435b and 465b, while providing for direction of electric power from one or both of contacts 435a and 435b to communications device or system 440). Alternatively, dynamic circuitry may be used that (in addition to the resistors, capacitors, inductors, regulators, potentiometers, and/or the like) might include switches and controllers (that receive sensor data from one or more of the various sensors described herein and control the switches and/or potentiometers (or other power regulation components) to deliver specified electric power to each of the communications system 440 and one or more of the internal contact terminals 445).

The various components of the device 410 of FIG. 4 may be incorporated within a single housing or body that includes the entirety of the light socket attachment 430, external contact terminals 435, communications system 440, internal contact terminals 445, light bulb receptacle 450, and circuitry 330; alternatively, the device 410 might comprise a plurality of components divided between two or more discrete housings.

The device 410, the light socket 420, the light socket attachment 430, the first external contact terminal 435a, the communications device 440, the first internal contact terminal 445a, the light bulb receptacle 450, the light bulb 460, and the contact terminal 465a of system 400 might otherwise correspond to the device 110, the light socket 120, the light socket attachment 130, the first external contact terminal 135, the communications device 140, the first internal contact terminal 145, the light bulb receptacle 150, light bulb 160, and contact terminal 165 of system 100 of FIG. 1, and the descriptions of the components of system 100 are applicable to the corresponding components in system 400.

Exemplary Methods

Figure 5:
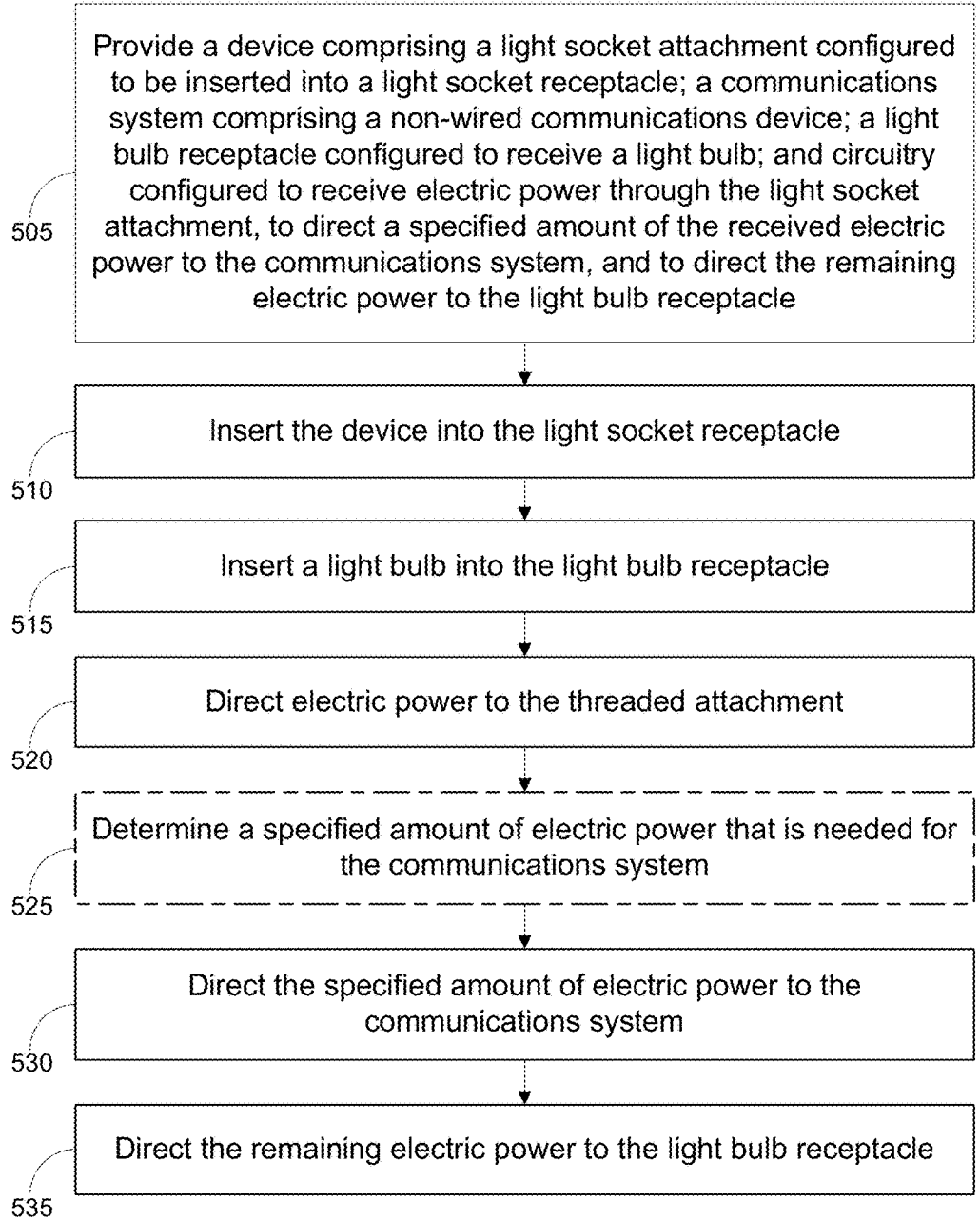
FIG. 5 is a flow diagram illustrating a method of implementing wireless radio functionality using a device that is compatible with a light socket, in accordance with various embodiments.

FIG. 5 is a flow diagram illustrating a method 500 of using a wireless radio functionality device that is compatible with a light socket, in accordance with various embodiments.

While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the systems 100, 200, 300, and 400 of FIGS. 1, 2, 3, and 4 respectively (or components thereof), such methods may also be implemented using any suitable hardware (or software) implementation. Similarly, while each of the systems 100, 200, 300, and 400 of FIGS. 1, 2, 3, and 4, respectively (or components thereof), can operate according to the method 500 illustrated by FIG. 5 (e.g., by executing instructions embodied on a computer readable medium), the systems 100, 200, 300, and 400 of FIGS. 1, 2, 3, and 4, respectively, can each also operate according to other modes of operation and/or perform other suitable procedures.

FIG. 5 represents a method 500 of using a device (which might correspond to device 110 of FIG. 1, or the like) that is compatible with a light fixture socket (which might correspond to light sockets 120 and 420 of FIGS. 1 and 4, respectively, or the like) and that has a communications system (which might correspond to communications devices or systems 140, 340, and 440 of FIGS. 1-3, respectively, or the like) for providing wireless radio services. In some embodiments, the method 500, at block 505, comprises providing a device comprising a light socket attachment configured to be inserted into a light socket receptacle; a communications system comprising a non-wired communications device, a light bulb receptacle configured to receive a light bulb; and circuitry configured to receive electric power through the light socket attachment, to direct a specified amount of the received electric power to the communications system, and to direct the remaining electric power to the light bulb receptacle. According to some embodiments, the light socket attachment and the light bulb receptacle may be compatible with one of a threaded attachment configuration, a plug-in attachment configuration, a twist and lock attachment configuration, a pin attachment configuration, or a prong attachment configuration, and/or the like. In some cases, the non-wired communications device might comprise one of a wireless radio or a light-based communications device, or the like, where the wireless radio might comprise one of a WiFi radio, a cellular communications transceiver, or a Bluetooth transceiver, or the like, and where the light-based communications device might comprise a Li-Fi communications device, or the like.

The device may be inserted into the light socket receptacle (block 510). A light bulb may be inserted into the light bulb receptacle (block 515).

The electric power may then be directed from a power source to the device's light socket attachment that is configured to be inserted in the light socket receptacle (block 520). One or more processors (such as those described in FIG. 2) may determine a specified amount of electric power that is needed to power the communications system of the device (optional block 525) and may issue instructions to direct the determined specified amount of electric power to the communications system (block 530). Based on the instructions issued by the one or more processors, the determined specified amount of electric power is directed to the communications system (block 530) while the remaining electric power (i.e., the current that is not directed to the communications system) is directed to the light bulb receptacle (generally, or the internal contact terminal(s) specifically) of the device that is configured to receive a light bulb (block 535), to power the light bulb when it is inserted into the light bulb receptacle. Alternatively, by use of passive circuitry (e.g., resistors, capacitors, inductors, regulators, etc., or any combination of such components), the specified amount of electric power may be directed to the communications system, while the remaining electric power may be directed to the light bulb receptacle (if a load (i.e., a light bulb with an operational lighting element(s)) is present in the light bulb receptacle with the appropriate terminals of the light bulb in contact with corresponding terminals in the light bulb receptacle. In other words, the circuitry may be configured to direct the specified amount of electric power to the communications system by default (block 530) (rather than having to determine the specified amount of electric power to send, thereby skipping the step at block 525).

The one or more processors may further receive input from and be in communication with a plurality of sensors including, but not limited to, motion detection sensors, noise sensors, and/or infrared sensors to determine when a person is in the same room as a device. The one or more processors may direct the device to only provide electric power to the communications device and/or light bulb receptacle containing a light bulb (or a lighting element in the light bulb) when the sensors detect that a person is in the same room as the device. The sensors may be housed within the device and/or may be separate from the device.

The one or more processors may further receive input from the light bulb receptacle of the device to determine whether a lighting element is present in the light bulb receptacle. If the one or more processors determine that a light bulb (or a lighting element) is not present in the light bulb receptacle, then the one or more processors may instruct the device to not send electric power to the light bulb receptacle. Alternatively, if a light bulb is not present (or if the lighting element in the form of a filament is broken or the like), an open circuit condition might automatically result in no electric power leading to the internal contact terminals (or to the light bulb receptacle as a whole).

Exemplary Systems

FIGS. 6A-6F (collectively, "FIG. 6") are schematic diagrams illustrating various systems 600, 600', 600", 600''', 600'''', and 600''''' (collectively, "system 600") for implementing wireless radio functionality using a device that is compatible with a light socket, in accordance with various embodiments. For simplicity of illustration, not all neutral wires (i.e., dashed lines) in FIG. 6 are drawn to all applicable sub-components of the device 610.

With reference to FIG. 6, system 600 might comprise device 610, light socket 620 (or light socket receptacle 620), a switch 630, a light bulb 640, circuit or circuitry 650, wireless communications system(s) 660 (which could include non-wired communications systems such as WiFi communications, cellular communications, Bluetooth communications, Li-Fi communications, and/or the like), one or more sensors 670, one or more adapters 680, and one or more processors 690. The light socket 620 is a light socket for one of a floor, table, wall, or ceiling light or lamp. The light bulb 640 can be one of a light-emitting diode ("LED") light bulb, an incandescent light bulb, a fluorescent light bulb (e.g., CFL bulb or the like), and/or the like. The light bulb 640 can either be a two-way type light bulb (as shown in FIGS. 1, 6A-6C, and 6F, or the like), or a three-way type light bulb (as shown in FIGS. 4, 6D, and 6E, or the like). Circuit 650 may comprise either a passive circuit or a dynamic circuit, with the passive circuit automatically directing power to the light bulb 640 and/or to the wireless communications system 660, and with the dynamic circuit actively controlling when and how much power to send to the light bulb 640 and/or to the wireless communications system 660 (in some cases, controlled by the processor(s) 690). The processor(s) 690, which might in some cases be integrated within circuit 650 (or separately disposed within device 610), might determine a specified amount of power to supply to the wireless communications system 660, might send instructions to circuit 650 (or other components) to direct power to one or both of the light bulb 640 or the wireless communications system 660.

The one or more adapters 680 (which may be either integrated within circuit 650 or separately disposed within device 610) may be one or more wired communications adapters that provide a PLC link to the wireless communications system 660 through the light socket attachment of device 610 that is inserted in light socket 620. The one or more adapters 680 may further be used to convert a three-terminal A/C power source to a two-terminal A/C power source and provide a two-terminal power connection through a light bulb receptacle to a lighting element of a light bulb. The PLC link may be at least one of a two-terminal A/C power connection or a three-terminal A/C power connection. Further, the powerline communications link may be implemented using specifications including, but not limited to, G.hn specifications, HomePlug specifications (including, without limitation, HomePlug 1.0 specification, HomePlug AV specification, HomePlug AV2 specification, HomePlug Green PHY specification, HomePlug Access Broadband over Power Line ("BPL") specification, and/or the like), or other IEEE 1901 standard related specifications, and/or the like).

The one or more sensor(s) 670 (or sensor(s) 670b in FIGS. 6B-6E, or the like) might monitor the area surrounding the device 610 and/or the light socket 620. In response to detecting a trigger event—i.e., proximity of a user(s) or a wireless user device(s), motion caused by a user(s), sounds beyond predetermined threshold sound levels, light beyond predetermined luminance (or other light) levels, valid remote control signals (e.g., infrared ("IR") signals, Bluetooth signals, radio frequency ("RF") signals, control signals over PLC, programmable timer (or time of day) control signals, etc.), and/or the like —, the sensor(s) 670 (or 670b) would send a control signal to the circuit 650 to turn on or turn off the light bulb 640 (i.e., to supply power or to prevent supply of power to the light bulb 640 (or 640'), assuming that the light bulb 640 (or 640') is inserted in the light bulb receptacle of device 610, that the light bulb 640 (or 640') is operational, and that switch 630 is turned on).

The device 610 is (removably) inserted into the light socket 620 in a manner as described above with respect to FIGS. 1-5 (i.e., the light socket attachment of device 610 is inserted into the light socket receptacle of light socket 620). A light bulb 640 is similarly (removably) inserted into device 610 in a manner as also described above with respect to FIGS. 1-5 (i.e., the light bulb 640 is inserted into the light bulb receptacle of device 610). Although the light bulb 640, the light bulb receptacle of device 610, the light socket attachment of device 610, and the light socket 620 are shown in FIG. 6 to be of a threaded attachment type or configuration, the various embodiments are not so limited, and the attachment type or configuration of these components may be one of a threaded attachment configuration, a plug-in attachment configuration, a twist and lock attachment configuration, a pin attachment configuration, or a prong attachment configuration, and/or the like.

In FIG. 6, each of the solid and dash-long dash connection lines represent a "hot" or "live" wire, while the dash connection lines represent a "neutral" wire, and the gray connection lines represent a "ground" or "bare" wire. The short gray lines between two adjacent switch components each represents an electrically isolated mechanical connection between the two adjacent switch components that cause the two adjacent switch components to move in concert (or to move together). The double-headed arrows indicate that a component may be moved in two directions as indicated by said arrows. The lightning bolt symbols are indicative of wireless communications. The dash-lined component blocks denote optional components. In the embodiments of FIG. 6, PLC may be implemented to supply data over power line to the wireless communications system 660, when appropriately connected (via the various switches). Alternatively, or additionally, so long as it is supplied with power, wireless communications system 660 can serve as a wireless communications relay that receives wireless communications signals (e.g., data signals, voice signals, etc.) and transmits the received signals. In conjunction with PLC, wireless communications system 660 can receive at least one of PLC signals and/or wireless communications signals and can transmit at least one of PLC signals and/or wireless communications signals.

Turning to FIG. 6A, when switch 630 is turned on, power is supplied to circuit 650 via light socket 620 and the light socket attachment of device 610 (corresponding to light socket attachment 130 or 430 of FIGS. 1 and 4, or the like). Circuit 680 directs the power to one or both of the light bulb 640 and/or the wireless communications system 660. For a passive pass-through type circuit 650, when switch 630 is turned on, both the light bulb 640 and the wireless communications system 660 will be supplied with power. If system 600 has an active PLC and signals are transmitted via PLC, the circuit 650 (in conjunction with adapter(s) 680) would convert the PLC signals into data signals that wireless communications system 660 can receive and send. As described above, the sensor(s) 670 can independently control operation of the light bulb 640 even when switch 630 is turned on. In this manner, when switch 630 is turned on, the wireless communications system 660 can be supplied with power to operate. For a dynamic system, the circuit 650 (in conjunction with processor(s) 690) determines how much power to supply to one or both of the wireless communications system and the light bulb 640, and directs the determined power to the one or both of the wireless communications system and the light bulb 640.

FIG. 6B depicts an embodiment 600' in which the wireless communications system 660 is independently controlled by a separate switch (i.e., switch 665), which may be controlled in response to signals from sensor(s) 670a. In some embodiments, sensor(s) 670a might include, without limitation, at least one of one or more proximity sensors, one or more motion sensors, one or more sound sensors, one or more ambient light sensors, or one or more remote control signal sensors, and/or the like. The one or more sensor(s) 670a might monitor the area surrounding the device 610 and/or the light socket 620. In response to detecting a trigger event—i.e., proximity of a user(s) or a wireless user device(s), motion caused by a user(s), sounds beyond predetermined threshold sound levels, light beyond predetermined luminance (or other light) levels, valid remote control signals (e.g., infrared ("IR") signals, Bluetooth signals, radio frequency ("RF") signals, control signals over PLC, programmable timer (or time of day) control signals, etc.), and/or the like —, the sensor(s) 670a would send a control signal to the switch 665 to close the switch (i.e., to turn it on), so that power can be supplied to the wireless communications system 660 (assuming switch 630 is also turned on). In FIG. 6B, sensor(s) 670b (which correspond to sensor(s) 670 in FIG. 6A) independently control supply of power to the light bulb 640 (assuming that the light bulb 640 is inserted in the light bulb receptacle of device 610, that the light bulb 640 is operational, and that switch 630 is turned on).

FIG. 6C depicts an embodiment for implementing a dimmer switch for the light bulb 640. In FIG. 6C, system 600'' comprises a dimmer switch 630' and a power control device 665'. In some cases, the power control device 665' might be integrated within circuit 650. The dimmer switch 630' has an "Off" state and a sliding scale "On" state, which supplies either a gradually or an incremental increase/decrease in power to the load (in this case, to the light socket 620 and device 610). The power control 665' ensures that any power received by device 610 is first supplied to the wireless communications system 660, and any remaining power is then supplied to the light bulb 640 (if inserted into the light bulb receptacle of device 610 and if operational). Power control 665' also prevents excess power from being supplied to the wireless communications system 660 in the case that dimmer switch 630' is set to a state that supplies more power to the wireless communications system 660 than it can handle and in the case that no light bulb is inserted in the light bulb receptacle of device 610 or in the case that the light bulb 640 is in an open circuit condition (i.e., damaged or the like) even though it is inserted in the light bulb receptacle.

Thus, when the dimmer switch 630' is turned off, the switch 630' creates an open circuit condition and no power is transmitted to device 610. When the dimmer switch 630' is "On," a closed circuit condition arises and power is transmitted to circuit 650. At its lowest "On" setting, the dimmer switch 630' supplies power to the circuit 650, and circuit 650 and/or power control device 665' diverts all available power to the wireless communications system 660, with the result that no power goes to the light bulb 640. When the power level control on the dimmer switch 630' causes the power to flow at any level between the lowest "On" setting and the highest "On" setting, circuit 650 and/or power control device 665' first diverts or directs all power to the wireless communications system 660 until the power reaches the maximum input power level of the wireless communications system 660 (or until sufficient power is supplied to the wireless communications system 660), then any remaining power is directed to the light bulb 640 (assuming that it is inserted in the light bulb receptacle and that the light bulb is operational).

FIG. 6D depicts an embodiment for implementing a three-terminal (or three-wire) power connection. In FIG. 6D, system 600''' comprises a lighting device cable in the form of a "three wire" cable 635. A second "hot" wire (depicted in FIG. 6D as a dash-long dash connection line) is added from the power supply-side (i.e., right side in FIG. 6D) of the switch that connects through the second conductor or contact terminal of a lamp socket 620 that is capable of supporting a 3-way light bulb. This enables the components in 610 (including the wireless communications system 660, and in some cases, the circuit 650, the sensors 670a and 670b, the adapter(s) 680, and the processor(s) 690, or the like, as well) to be powered independent of the state of switch 630. A first "hot" wire (depicted in FIG. 6D as a solid connection line) connects switch 630 to the first conductor or contact terminal of the lamp socket 620. A "neutral" wire (depicted in FIG. 6D as a dashed connection line), and a "bare" or "ground" wire (depicted in FIG. 6D as a solid gray connection line) are shown between switch 630 and light socket 620. Like a three-way light bulb implementation as described in detail below with respect to FIG. 6E, system 600''' comprises two electrically isolated contact terminals at each of the light socket receptacle of light socket 620, light socket attachment of device 610, and light bulb receptacle of device 610. System 600''' is compatible with either a two-way light bulb 640 (as shown in FIGS. 1 and 6A-6C, or the like) or a three-way light bulb 640' (as shown in FIGS. 4 and 6E, or the like). Optional switch 665'', which may be controlled by optional sensor(s) 670a (as described above with respect to FIG. 6B), comprises two switch components that are connected together via an electrically isolated mechanical connections (depicted by the short gray line between the switch components).

Assuming optional switch 665'' is turned on (or assuming direct connection between circuit 650 and wireless communications system 660 within any intervening switches), when switch 630 is turned off, the switch 630 creates an open circuit condition to the light bulb 640'. However, power continues to be supplied to the remaining components in device 610 through the second "hot" wire (depicted in FIG. 6D as the dash-long dash connection line) of the cable 635. Switch 665'' allows a user to control whether power is supplied to the wireless communications system 660. This switch can be directly or remotely controlled allowing the user to turn the wireless communications system on or off independently from the state of switch 630. The switch 630 is merely used to control the power to the light bulb 640'. In the case of a three-way light bulb being used, circuit 650 might contain internal circuitry to simulate control of the operation of the three-way light bulb (in a manner as described below with respect to FIG. 5E). In other words, the second "hot" wire is not used to supply power to the light bulb 640'; power is only supplied to the light bulb 640' via the first "hot" wire and control of power to one, both, or neither of the contact terminals to control the "low"/"medium," "high," or "off" states of the three-way light bulb are governed electrically by the circuit 650.

With the "ground" wire acting as a common return data path between the "hot" wire and the "neutral" wire, two "channels" may result to carry the PLC data signals, thereby achieving a theoretical doubling of the bandwidth. As there may be some losses due to imbalances between the two "channels," the effective bandwidth would be reduced to less than a full 2 times bandwidth compared to a two-wire (or two terminal system), in which there is only one "hot" wire and one "neutral" wire.

FIG. 6E depicts an embodiment for implementing three-way lighting, using the three-terminal configuration as described above with respect to FIG. 4. In three-way lighting, three lighting modes can be selected by use of a switch (in this case switch 625)—namely, high, medium, and low. In FIG. 6E, system 600"" comprises switch 625 and two electrically isolated contact terminals at each of the light socket receptacle of light socket 620, light socket attachment of device 610, light bulb receptacle of device 610, and light bulb 640. A three-way light bulb 640' comprises two lighting elements 640a and 640b (shown in FIG. 6E as resistive filaments). Lighting element 640a is a medium-power (or medium-wattage) lighting element, while lighting element 640b is a low-power (or low-wattage) lighting element. Switch 625 comprises two switch components that are connected together via an electrically isolated mechanical connections (depicted by the short gray line between the switch components). Switch 625 further comprises 8 contact points with which the two switch components are switchably connected. Because the two switch components are mechanically connected, they move together and only four positions are possible within switch 625 as shown in the non-limiting example of FIG. 6E—specifically, the "Off" position (depicted in FIG. 6E as the top-most position, with the two switch components in contact with the first and fifth contact points, respectively), the "Low" position (depicted in FIG. 6E as the second position from the top, with the two switch components in contact with the second and sixth contact points, respectively), the "Medium" position (depicted in FIG. 6E as the third position from the top, with the two switch components in contact with the third and seventh contact points, respectively), and the "High" position (depicted in FIG. 6E as the bottom-most position, with the two switch components in contact with the fourth and eighth contact points, respectively).

In FIG. 6E, when switch 630 is turned off, the switch 630 creates an open circuit condition and no power is transmitted to device 610 or to switch 625. When switch 630 is turned on and switch 625 is in the "Off" position, the switch 625 creates the open circuit condition and no power is transmitted to device 610. When switch 630 is turned on and switch 625 is in the "Low" position, a closed circuit condition arises and power is transmitted to lighting element 640b of light bulb 640' (assuming the lighting element 640b is operational and no open circuit condition arises from a break or fault in lighting element 640b). Here, electricity flows along the "hot" wire through the switch 625 to the lighting element 640b along the dash-long dash connection line (via the second contact terminal of each of the light socket 620, the light socket attachment of device 610, the light bulb receptacle of device 610, and the light bulb 640') and back through the "neutral" wire (i.e., return electrical path). When switch 630 is turned on and switch 625 is in the "Medium" position, a closed circuit condition arises and power is transmitted to lighting element 640a of light bulb 640' (assuming the lighting element 640a is operational and no open circuit condition arises from a break or fault in lighting element 640a). Here, electricity flows along the "hot" wire through the switch 625 to the lighting element 640a (via the first contact terminal of each of the light socket 620, the light socket attachment of device 610, the light bulb receptacle of device 610, and the light bulb 640') along the solid connection line and back through the "neutral" wire (i.e., return electrical path).

When switch 630 is turned on and switch 625 is in the "High" position, a closed circuit condition arises and power is transmitted to both the lighting element 640a of light bulb 640' (assuming the lighting element 640a is operational and no open circuit condition arises from a break or fault in lighting element 640a) and the lighting element 640b of light bulb 640' (assuming the lighting element 640b is operational and no open circuit condition arises from a break or fault in lighting element 640b). Here, electricity flows along the "hot" wire through the switch 625 to each of the lighting element 640a (via the first contact terminal of each of the light socket 620, the light socket attachment of device 610, the light bulb receptacle of device 610, and the light bulb 640') along the solid connection line and the lighting element 640b (via the second contact terminal of each of the light socket 620, the light socket attachment of device 610, the light bulb receptacle of device 610, and the light bulb 640') along the dash-long dash connection line, and back through the "neutral" wires (i.e., return electrical path(s)). In the "High" state, the illumination by the three-way light bulb 640' is the sum of the illumination from each of the medium-wattage and the low-wattage lighting elements 640a and 640b. In any of the "Low," "Medium," and "High" states of switch 625 (and assuming switch 630 is turned on), if switch 665" is also turned on, then wireless communications system 660 would also receive power. In some implementations switches 630 and 625 may be combined.

System 600"" is also compatible with the two-way light bulb 640 (as shown in FIGS. 1 and 6A-6C, or the like). The two-way light bulb 640 will only turn on when the switch 630 is turned on and when switch 625 is either in the "Medium" or "High" state. In some cases, to prevent a short circuit condition between the circuit 650 and the grounded (or neutrally connected) portion of the light bulb 640 (i.e., when the switch 625 is in the "Low" or "High" state), circuit 650 might further comprise a short circuit detector and an internal switch (both not shown) that detects such short circuit conditions and creates an internal open circuit condition, respectively.

FIG. 6F depicts an embodiment that utilizes a wiper switch or the like. In FIG. 6F, system 600"" comprises a switch 625' in place of circuit 650. The switch 625', which might be referred to as a wiper switch or the like, comprises a wiper 625a and contact points 625b-625f. The wiper 625a is connected to—and rotatable about—contact point 625b. When switch 630 is turned on and when wiper 625a is rotated so as to connect contact point 625b and one of contact point 625c or 625f (which are electrically isolated from other components), an open circuit condition arises and no power is transmitted to device 610. When switch 630 is turned off, the switch 630 creates the open circuit condition and no power is transmitted to device 610. When switch 630 is turned on and when wiper 625a is rotated so as to connect contact point 625b and only contact point 625d, a closed circuit condition arises and power is transmitted only to light bulb 640 (assuming the lighting element in light bulb 640 is operational and no open circuit condition arises in the light bulb 640 itself). Here, electricity flows along the "hot" wire through the wiper 625a to the light bulb 640 (via the internal contact terminal of device 610 (e.g., internal contact terminal 145 or 445a of FIGS. 1 and 4, respectively, or the like)) and back through the "neutral" wire. When switch 630 is turned on and when wiper 625a is rotated so as to connect contact point 625b and only contact point 625e, a closed circuit condition arises and power is transmitted only to wireless communications system 660. Here, electricity flows along the "hot" wire through the wiper 625a to the communications system 660 and back through the "neutral" wire. When switch 630 is turned on and when wiper 625a is rotated so as to connect contact point 625b and both contact points 625d and 625e, a closed circuit condition arises and power is transmitted to both light bulb 640 (assuming the lighting element in light bulb 640 is operational and no open circuit condition arises in the light bulb 640 itself) and communications system 660. Here, electricity flows along the "hot" wire through the wiper 625a to each of the light bulb 640 (via the internal contact terminal of device 610 (e.g., internal contact terminal 145 or 445a of FIGS. 1 and 4, respectively, or the like)) and the communications system 660, and back through the "neutral" wire from each of the light bulb 640 and the communications 660.

The various embodiments described above are merely illustrative and any suitable configuration or arrangement of the light socket wireless (or non-wired) communications system may be implemented in accordance with the various embodiments.

Exemplary System and Hardware Implementation

Figure 7:
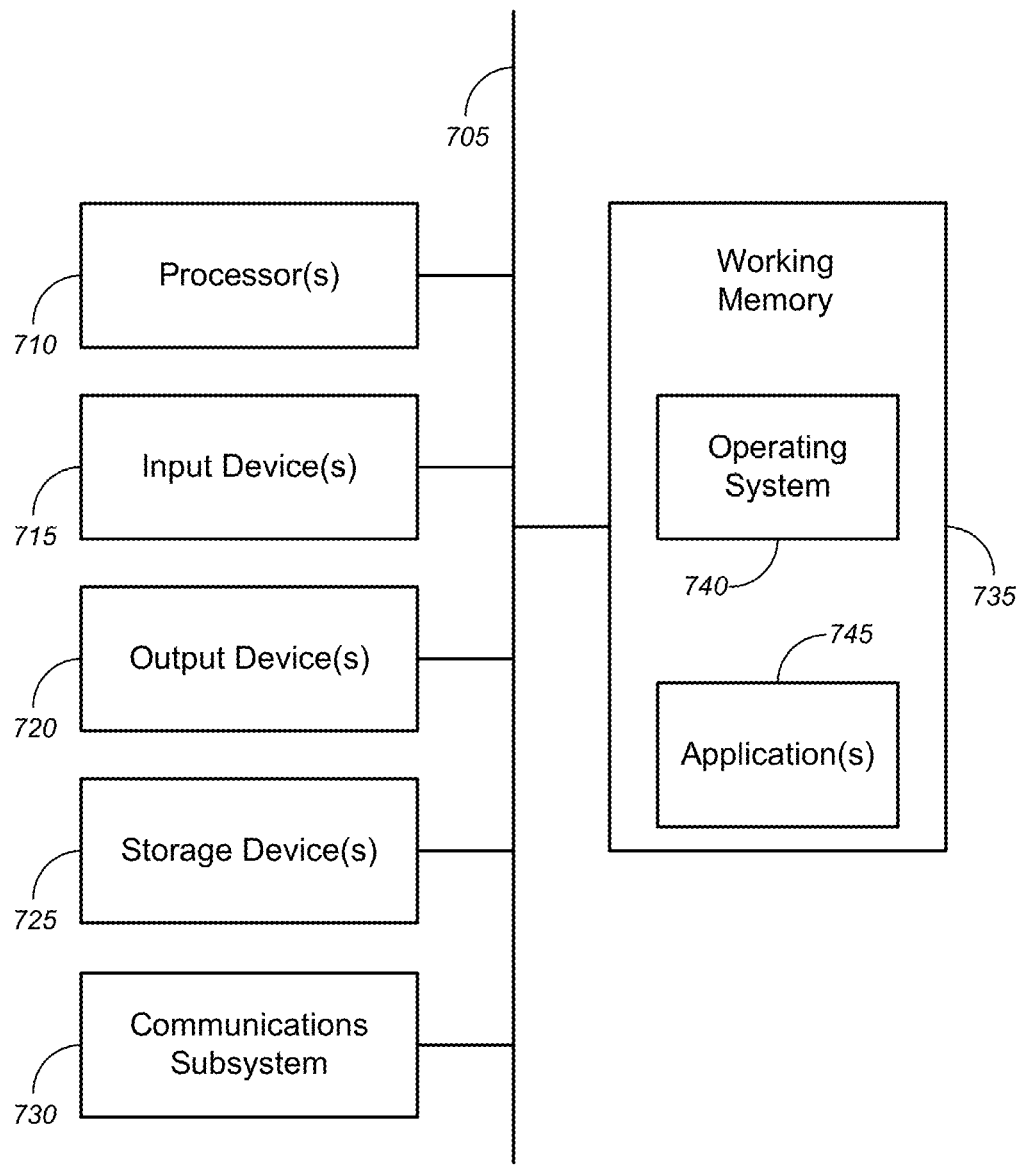
FIG. 7 is a block diagram illustrating an exemplary computer or system hardware architecture, in accordance with various embodiments.

FIG. 7 is a block diagram illustrating an exemplary computer or system hardware architecture, in accordance with various embodiments. FIG. 7 provides a schematic illustration of one embodiment of a computer system 700 of the service provider system hardware that can perform the methods provided by various other embodiments, as described herein, and/or can perform the functions of computer or hardware system (i.e., devices 110, 410, and 610, communications devices or systems 140, 340, 440, and 660, etc.), as described above. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer or hardware system 700—which might represent an embodiment of the computer or hardware system (i.e., devices 110, 410, and 610, communications devices or systems 140, 340, 440, and 660, etc.), described above with respect to FIGS. 1-6—is shown comprising hardware elements that can be electrically coupled via a bus 705 (or may otherwise be in communication, as appropriate). The hardware elements may include one or more processors 710, including, without limitation, one or more general-purpose processors and/or one or more special-purpose processors (such as microprocessors, digital signal processing chips, graphics acceleration processors, and/or the like); one or more input devices 715, which can include, without limitation, a mouse, a keyboard, and/or the like; and one or more output devices 720, which can include, without limitation, a display device, a printer, and/or the like.

The computer or hardware system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 700 might also include a communications subsystem 730, which can include, without limitation, a modem, a network card (wireless or wired), an infra-red communications device, a wireless communications device and/or chipset (such as a Bluetooth™ device, an 802.11 device, a WiFi device, a Li-Fi device, a WiMax device, a WWAN device, a Z-Wave device, a ZigBee device, cellular communications facilities, etc.), and/or the like. The communications subsystem 730 may permit data to be exchanged with a network (such as the network described below, to name one example), with other computer or hardware systems, and/or with any other devices described herein. In many embodiments, the computer or hardware system 700 will further comprise a working memory 735, which can include a RAM or ROM device, as described above.

The computer or hardware system 700 also may comprise software elements, shown as being currently located within the working memory 735, including an operating system 740, device drivers, executable libraries, and/or other code, such as one or more application programs 745, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 700 and/or might take the form of source and/or installable code, which, upon compilation and/or installation on the computer or hardware system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 700) to perform methods in accordance with various embodiments of the invention. According to a set of embodiments, some or all of the procedures of such methods are performed by the computer or hardware system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire and fiber optics, including the wires that comprise the bus 705, as well as the various components of the communications subsystem 730 (and/or the media by which the communications subsystem 730 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A device, comprising:
 a light socket attachment that mates with a light socket receptacle of a lighting device when the light socket attachment is removably coupled to the lighting device, wherein the light socket receptacle of the lighting device is a three-terminal power connection light socket receptacle;
 a communications system comprising a non-wired communications device;
 a wired communications adapter contained within the communications system, wherein the wired communications adapter provides a link between the communications system and the light socket receptacle, and wherein the wired communications adapter is configured to transmit or receive data via the three terminals of the three-terminal power connection light socket, wherein a first terminal and a second terminal of the three terminal power connection light socket transmit data to the communications system, wherein a third terminal separate from the first terminal and the second terminal of the three terminal power connection light socket receives data from the communications system;
 a light bulb receptacle configured to receive a light bulb; and
 circuitry that receives electric power through the light socket attachment, the circuitry directing a specified amount of power from the received electric power to the communications system while directing remaining power of the received electric power to the light bulb receptacle.

2. The device of claim 1, wherein the communications system functions as at least one of a wireless access point, a wireless repeater, or a wireless client.

3. The device of claim 1, wherein the non-wired communications device comprises one of a wireless radio or a light-based communications device, wherein the wireless radio comprises one of a WiFi radio, a cellular communications transceiver, or a Bluetooth transceiver, wherein the light-based communications device comprises a Li-Fi communications device.

4. The device of claim 1, wherein the communications system further comprises a wireless communications adapter.

5. The device of claim 1, wherein the link provided by the wired communications adapter is a Power-Line Communications ("PLC") link with the communications system.

6. The device of claim 4, wherein the PLC link is based on at least one of G.hn specification or HomePlug specification.

7. The device of claim 4, wherein the wireless communications adapter provides backhaul functionality.

8. The device of claim 1, wherein the light bulb comprises a lighting element.

9. The device of claim 8, wherein the lighting element is at least one of a light-emitting diode, an incandescent lighting element, or a fluorescent lighting element.

10. The device of claim 1, wherein the light socket attachment and the light bulb receptacle are compatible with one of a threaded attachment configuration, a plug-in attachment configuration, a twist and lock attachment configuration, a pin attachment configuration, or a prong attachment configuration.

11. The device of claim 1, wherein the light bulb receptacle is further configured to receive a light bulb that is compatible with at least one of a two-terminal power source or a three-terminal power source.

12. The device of claim 1, further comprising one or more sensors, the one or more sensors comprising at least one of one or more proximity sensors, one or more motion sensors, one or more sound sensors, or one or more ambient light sensors, wherein the circuitry directs the remaining power of the received electric power to the light bulb receptacle in response to receiving predetermined signals from the one or more sensors.

13. A method, comprising:
providing a device comprising a light socket attachment that mates with a light socket receptacle of a lighting device when the light socket attachment is removably coupled to the lighting device, a communications system comprising a non-wired communications device, a wired communications adapter contained within the communications system, a light bulb receptacle that receives a light bulb, and circuitry that receives electric power through the light socket attachment, the circuitry directing a specified amount of power from the received electric power to the communications system while directing remaining power of the received electric power to the light bulb receptacle, wherein the light socket receptacle of the lighting device is a three-terminal power connection light socket, wherein the wired communications adapter provides a link between the communications system and the light socket receptacle, and wherein the wired communications adapter is configured to transmit or receive data via the three terminals of the three-terminal power connection light socket, wherein a first terminal and a second terminal of the three terminal power connection light socket transmit data to the communications system, wherein a third terminal separate from the first terminal and the second terminal of the three terminal power connection light socket receives data from the communications system;
inserting the light socket attachment of the device into the light socket receptacle; and
inserting the light bulb into the light bulb receptacle.

14. The method of claim 13, wherein the communications system functions as at least one of a wireless access point, a wireless repeater, or a wireless client.

15. The method of claim 13, wherein the non-wired communications device comprises one of a wireless radio or a light-based communications device, wherein the wireless radio comprises one of a WiFi radio, a cellular communications transceiver, or a Bluetooth transceiver, wherein the light-based communications device comprises a Li-Fi communications device.

16. A method for providing electric power to a device, the method comprising:
providing a device comprising a light socket attachment that mates with a light socket receptacle of a lighting device when the light socket attachment is removably coupled to the lighting device, a communications system comprising a processor and a non-wired communications device, a wired communications adapter contained within the communications system, a light bulb receptacle that receives a light bulb, and circuitry that receives electric power through the light socket attachment, the circuitry directing a specified amount of power from the received electric power to the communications system while directing remaining power of the received electric power to the light bulb receptacle, wherein the light socket receptacle of the lighting device is a three-terminal power connection light socket, wherein the wired communications adapter provides a link between the communications system and the light socket receptacle, and wherein the wired communications adapter is configured to transmit or receive data via the three terminals of the three-terminal power connection light socket, wherein a first terminal and a second terminal of the three terminal power connection light socket transmit data to the communications system, wherein a third terminal separate from the first terminal and the second terminal of the three terminal power connection light socket receives data from the communications system;
inserting the light socket attachment of the device into the light socket receptacle;
inserting the light bulb into the light bulb receptacle;
directing electric power from the light socket receptacle to the light socket attachment;
determining, with the processor of the communications system, the specified amount of power to be directed to the communications system;
directing, with the processor of the communications system, the determined specified amount of power to the communications system through the circuitry; and
directing, with the processor of the communications system, the remaining power to the light socket receptacle of the device through the circuitry.

17. The method of claim 16, wherein the communications system further comprises a wireless communications adapter.

18. The method of claim 17, wherein the link provided by the wired communications adapter is a Power-Line Communications ("PLC") link with the communications system.

19. The method of claim 18, wherein the PLC link is based on at least one of G.hn specification or HomePlug specification.

20. The method of claim 17, wherein the wireless communications adapter provides backhaul functionality.

21. The method of claim 16, wherein the device further comprises one or more sensors, the one or more sensors comprising at least one of one or more proximity sensors, one or more motion sensors, one or more sound sensors, or one or more ambient light sensors, wherein the method further comprises:
- monitoring, with the one or more sensors, an area surrounding the lighting device; and
- in response to exceeding predetermined sensor threshold levels, sending, with the one or more sensors, a signal to the circuitry;
- wherein the circuitry directs the remaining power of the received electric power to the light bulb receptacle in response to receiving the signal from the one or more sensors.

* * * * *